(12) United States Patent
Kozakai et al.

(10) Patent No.: US 8,654,755 B2
(45) Date of Patent: Feb. 18, 2014

(54) DEVICE AND METHOD FOR COMMUNICATING WITH ANOTHER COMMUNICATION DEVICE VIA NETWORK FORWARDING DEVICE

(75) Inventors: Yasuyuki Kozakai, Kanagawa (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 474 days.

(21) Appl. No.: 11/555,490

(22) Filed: Nov. 1, 2006

(65) Prior Publication Data
US 2007/0110054 A1 May 17, 2007

(30) Foreign Application Priority Data

Nov. 16, 2005 (JP) ................................. 2005-332070

(51) Int. Cl.
*H04J 3/24* (2006.01)
(52) U.S. Cl.
USPC ............ 370/349; 370/389; 370/466; 709/232
(58) Field of Classification Search
USPC ............ 370/236, 349, 355–356, 389, 395.52, 370/466; 709/230, 232
See application file for complete search history.

(56) References Cited

U.S. PATENT DOCUMENTS

| | | | |
|---|---|---|---|
| 6,795,917 B1 | 9/2004 | Ylonen | |
| 6,957,346 B1 | 10/2005 | Kivinen et al. | |
| 2002/0124090 A1* | 9/2002 | Poier et al. | 709/228 |
| 2004/0143758 A1 | 7/2004 | Swander et al. | |
| 2006/0256815 A1* | 11/2006 | Kivinen et al. | 370/466 |
| 2007/0110054 A1* | 5/2007 | Kozakai et al. | 370/389 |
| 2007/0140226 A1 | 6/2007 | Gobara et al. | |

FOREIGN PATENT DOCUMENTS

| | | |
|---|---|---|
| JP | 2002-501332 | 1/2002 |
| JP | 2002-232450 | 8/2002 |
| JP | 2003-502913 | 1/2003 |
| WO | WO 2005/041500 A1 | 5/2005 |

OTHER PUBLICATIONS

A. Huttunen, et al., "UDP Encapsulation of IPsec ESP Packets", Network Working Group, RFC 3948, pp. 1-15, Jan. 2005.
T. Kivinen, et al., "Negotiation of NAT-Traversal in the IKE", Network Working Group, RFC 3947, pp. 1-16, Jan. 2005.

* cited by examiner

*Primary Examiner* — Andrew Lai
*Assistant Examiner* — Leon Andrews
(74) *Attorney, Agent, or Firm* — Oblon, Spivak, McClelland, Maier & Neustadt, L.L.P.

(57) ABSTRACT

The communication device includes a first transmitting unit that transmits to a server a first message transmitted according to a first protocol; a receiving unit that receives a port number message including a translated port number from the server via the network forwarding device; a first protocol processing unit that generates a second message that is to be transmitted according to the first protocol; a second protocol processing unit that generates a third message in which the first protocol is concealed by appending, to the generated second message, a header according to a second protocol; a third protocol processing unit that generates a fourth message in which the first protocol is concealed by appending, to the generated third message, a header according to a third protocol; and a second transmitting unit that transmits the generated fourth message to the server via the network forwarding device.

13 Claims, 17 Drawing Sheets

DEVICE AND METHOD FOR COMMUNICATING WITH ANOTHER COMMUNICATION DEVICE VIA NETWORK FORWARDING DEVICE

CROSS-REFERENCE TO RELATED APPLICATIONS

This application is based upon and claims the benefit of priority from the prior Japanese Patent Application No. 2005-332070, filed on Nov. 16, 2005; the entire contents of which are incorporated herein by reference.

BACKGROUND OF THE INVENTION

1. Field of the Invention

The present invention relates to a device and a method for communicating with another communication device connected to an external network via a network forwarding device that has an address translation function.

2. Description of the Related Art

In recent years, a network configuration using a Network Address Translation (NAT) Box is popularly used so that a larger number of devices than a finite number of global Internet Protocol (IP) addresses are able to communicate simultaneously with other devices connected to the Internet. The NAT Box is a router (i.e. a network forwarding device) that has a Network Address Translation (NAT) function and that forwards a received packet after rewriting the IP address or the port number in the received packet.

Every time a NAT Box detects a new communication started from a device under the NAT Box, the NAT Box generates and stores therein data called NAT mapping data used for mapping a translated address to a tuple of a source address and a destination address contained in a packet. The NAT Box translates addresses in the packets by referring to the NAT mapping data.

In many situations, the word "address" denotes not only an IP address but also an address used in a transport protocol such as a port number in a Transmission Control Protocol (TCP) header or in a User Datagram Protocol (UDP) header. Hereinafter, the address translation process performed by a NAT Box will be referred to as a "NAT translation".

The NAT Box that is widely used is able to forward, after performing a NAT translation, only such types of packets in which an IP header is followed by a TCP header, a UDP header, or an Internet Control Message Protocol (ICMP) header. Thus, for example, if a device under the NAT Box tries to communicate by using packets encrypted and inserted ESP header next to IP header according to transport mode of Encapsulating Security Payload (ESP), the NAT Box is not able to perform a NAT translation and to forward the packet. To cope with this situation, a technique has been proposed by which a UDP header is inserted between the IP header and the ESP header so that the NAT Box is able to perform a NAT translation and forward the packet. (For example, A. Huttunen et al., "RFC 3948, UDP Encapsulation of IPsec ESP Packets", [online], January 2005, retrieved from the Internet: <URL: http://www.ietf.org/rfc/rfc3948.txt> (hereinafter, "Document 1"); and T. Kivinen et al., "RFC 3947, Negotiation of NAT-Traversal in the IKE", [on line], January 2005, retrieved from the Internet: <URL: http://www.ietf.org/rfc/rfc3947.txt> (hereinafter, "Document 2")).

However, for example, when multiple devices under one NAT Box communicate with the same server on the Internet using the method disclosed in Document 1, there is a possibility that the application within the server is not able to judge from which one of the devices under the NAT Box, each of the packets has been received, and miscommunication of data occurs.

For example, it is assumed that multiple devices under one NAT Box use the same tuple of a source port number and a destination number in the UDP header and encapsulate a UDP datagram with an ESP header and a new UDP header so as to transmit the encapsulated UDP datagram to a server, and that the server eliminates the ESP header and the UDP header and decrypts the packet according to the method disclosed in Document 1. In this situation, the packets transmitted from the devices all have the same tuple of a source IP address, a destination IP address, a source port number, a destination port number, and a transport protocol type. Accordingly, the application within the server is not able to judge from which one of the devices under the NAT Box, each of the packets has been received.

To cope with this problem, Document 1 has proposed a technique to avoid occurrence of miscommunication of data as described above. More specifically, when the server has received an IP address and a port number of a Security Association (SA) during a key exchange process before a communication using an ESP is performed, the server checks to see if there is already an SA that has the tuple of the same IP address and the same port number. If there is such an SA, the key exchange process is canceled, and the communication with the ESP is cancelled. Thus, it is possible to avoid having miscommunication.

In addition, another technique used for avoiding miscommunication has been proposed by which a server replaces the source port number in a UDP header that has been encapsulated with an ESP, with the source port number in a UDP header provided between the IP header and the ESP header within a received packet (For example, United States Patent Application Laid-Open No. 2004/0143758, Specification).

A NAT translation is performed by a NAT Box on the source port number in the UDP header provided between the IP address and the ESP header within the packet described above. Due to a characteristic of the NAT Box, each tuple of a source IP address, a source port number, and a protocol type is always unique. As a result, the tuple of a source IP address, a destination IP address, and a protocol type in the packet received by the application is also unique. Accordingly, the application within the server is able to judge from which one of the devices under the NAT Box, each of the packets has been received.

However, with any of the methods disclosed in the documents above, a problem remains where the processing load of the server increases. More specifically, for example, according to the method disclosed in Document 1, it is necessary for the server to figure out whether there is already an SA having the same IP address and the same port number. Also, according to the method disclosed in the specification in United States Patent Application Laid-Open No. 2004/0143758, every time the server receives a packet, the server needs to replaces the source port number.

SUMMARY OF THE INVENTION

According to one aspect of the present invention, a communication device includes a first transmitting unit that transmits to a server a first message created according to a first protocol that a network forwarding device can translate a source port number, the network forwarding device being operable to translate each source port number contained in a protocol header of transmitted messages into a source port number capable of communicating with an external network;

a receiving unit that receives a port number message including a translated port number from the server via the network forwarding device, the translated port number being a source port number obtained after the network forwarding device performs an address translation when the first message is transmitted to the server; a first protocol processing unit that generates a second message that is to be transmitted according to the first protocol and in which a source port number contained in a protocol header is specified as a same value as the received translated port number; a second protocol processing unit that generates a third message in which the first protocol is concealed by appending, to the generated second message, a header according to a second protocol which cannot be translated; a third protocol processing unit that generates a fourth message in which the first protocol is concealed by appending, to the generated third message, a header according to a third protocol that can be translated; and a second transmitting unit that transmits the generated fourth message to the server via the network forwarding device.

According to another aspect of the present invention, a communication device includes a first transmitting unit that transmits a first message to an address information providing device that provides information related to an address including a source port number, via a network forwarding device, the first message being transmitted according to a first protocol that the network forwarding device can translate a source port number, and the network forwarding device being operable to translate a source IP address and a source port number into values to make it possible to communicate with an external network, for each of tuples of a protocol, a source IP address, and a source port number that are contained in a protocol header of a transmitted message; a receiving unit that receives an address information message from the address information providing device via the network forwarding device, the address information message including a translated port number that is a source port number obtained after the network forwarding device performs an address translation when the first message is transmitted to the address information providing device; a first protocol processing unit that generates a second message that is to be transmitted according to the first protocol and in which a source port number contained in a protocol header is specified as a same value as the received translated port number; a second protocol processing unit that generates a third message in which the first protocol is concealed by appending, to the generated second message, a header according to a second protocol which cannot be translated; a third protocol processing unit that generates a fourth message in which the first protocol is concealed by appending, to the generated third message, a header according to a third protocol that can be translated; and a second transmitting unit that transmits the generated fourth message to a server via the network forwarding device.

According to still another aspect of the present invention, a communicating method includes transmitting to a server a first message transmitted according to a first protocol that a network forwarding device can translate a source port number, the network forwarding device being operable to translate each source port number contained in a protocol header of transmitted messages into a source port number capable of communicating with an external network; receiving a port number message including a translated port number from the server via the network forwarding device, the translated port number being a source port number obtained after the network forwarding device performs an address translation when the first message is transmitted to the server; generating a second message that is to be transmitted according to the first protocol and in which a source port number contained in a protocol header is specified as a same value as the received translated port number; generating a third message in which the first protocol is concealed by appending, to the generated second message, a header according to a second protocol which cannot be translated; generating a fourth message in which the first protocol is concealed by appending, to the generated third message, a header according to a third protocol that can be translated; and transmitting the generated fourth message to the server via the network forwarding device.

According to still another aspect of the present invention, a communicating method includes transmitting a first message to an address information providing device that provides information related to an address including a source port number, via a network forwarding device, the first message being transmitted according to a first protocol that the network forwarding device can translate a source port number, and the network forwarding device being operable to translate a source IP address and a source port number into values to make it possible to communicate with an external network, for each of tuples of a protocol, a source IP address, and a source port number that are contained in a protocol header of a transmitted message; receiving an address information message from the address information providing device via the network forwarding device, the address information message including a translated port number that is a source port number obtained after the network forwarding device performs an address translation when the first message is transmitted to the address information providing device; generating a second message that is to be transmitted according to the first protocol and in which a source port number contained in a protocol header is specified as a same value as the received translated port number; generating a third message in which the first protocol is concealed by appending, to the generated second message, a header according to a second protocol which cannot be translated; generating a fourth message in which the first protocol is concealed by appending, to the generated third message, a header according to a third protocol that can be translated; and transmitting the generated fourth message to a server via the network forwarding device.

DETAILED DESCRIPTION OF THE INVENTION

Figure 1:
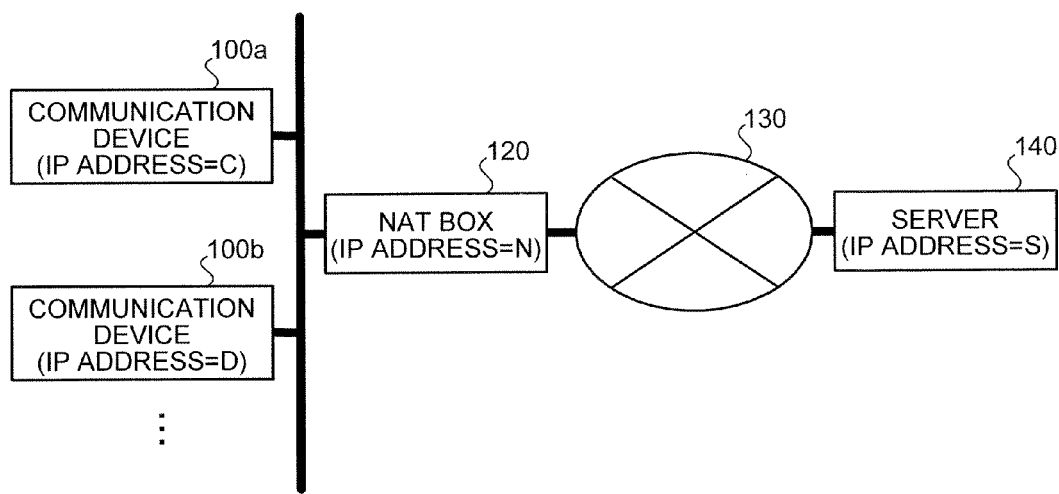
FIG. 1 is a block diagram of an entire network that includes a communication device according to a first embodiment of the present invention.

Exemplary embodiments of a device and a method for communication according to the present invention will be explained in detail, with reference to the accompanying drawings.

A communication device according to a first embodiment encapsulates, with an ESP, a message to be transmitted according to a UDP, the ESP being an encryption protocol that NAT translation cannot be performed. Further, the communication device transmits the message that has been encapsulated with a UDP header so as to allow a NAT translation to be performed, to a server on the Internet.

In that situation, the communication device receives a NAT translated source port number from the server and specifies the received source port number as the source port number in the UDP header encapsulated with the ESP so as to be able to communicate with the server.

Generally, each message transmitted and received on the Internet is divided into units of data called packets and transmitted. Each packet includes a header portion that stores therein address information of the source and the destination or the like and a payload portion that stores therein the data itself. Sometimes the information consisting of constructed the header portion and the payload portion is called a datagram.

In the following description, a piece of information that is consists of constructed an IP header and an IP payload will be referred to as a packet. A piece of information that is consists of constructed a UDP header and a UDP payload will be referred to as a UDP datagram. Also, a packet that includes information encrypted with an ESP will be, in particular, referred to as an ESP packet.

To encapsulate is to use an existing packet or an existing datagram as a new payload according to an arbitrary protocol and to conceal the protocol according to which the existing packet or the existing datagram has been generated by appending a new header according to the arbitrary protocol. Encapsulating sometimes also includes a modification processing of data such as an encryption process that is performed when a new payload is generated.

For example, by encrypting, with an ESP protocol, a UDP datagram generated according to the UDP protocol and appending an ESP header to the encrypted UDP datagram, it is possible to encapsulate the UDP datagram with the ESP.

The protocol used in the encapsulation to make the NAT translation possible is not limited to the UDP. It is possible to apply the contents of the present invention to any protocol as long as the protocol allows a NAT Box to perform a NAT translation and a transfer. Also, the protocol that does not allow a NAT translation to be performed is not limited to the ESP. It is possible to use, as a target, any other protocol such as another encryption protocol, as long as the protocol does not allow a NAT Box to perform a NAT translation and a transfer. Further, the protocol encapsulated with a protocol that does not allow a NAT translation to be performed is not limited to the UDP. It is possible to apply the contents of the present invention to any other protocol such as a TCP, if there is a possibility that miscommunication of data may occur due to conflict of source port numbers.

As shown in FIG. 1, the network according to the first embodiment is configured so that the communication device 100 is connected to the Internet 130 via a NAT Box 120 and communicates with a server 140, which is a communication partner being connected to the Internet 130.

In the drawing, two communication devices 100a and 100b to which mutually different private IP addresses, namely C and D, are assigned are shown; however these two communication devices have the same functions and the same configuration. Thus, the communication devices 100a and 100b will be collectively referred to as the communication device 100. A global IP address S is assigned to the server 140.

The NAT Box 120 is a device that has a function of selecting a transmission path by referring to a destination IP address contained in a received packet and relays the packet to another network. The NAT Box 120 has a Network Address Translation (NAT) function to translate a private IP address to a global IP address. A global IP address N is assigned to a network interface of the NAT Box 120 on the side connected to the Internet 130.

The communication device 100 obtains, from the server 140, a NAT translated source port number in a UDP header, by extending an Internet Key Exchange (IKE), which is a protocol used for exchanging and managing encryption keys. The communication device 100 generates a packet by encapsulating a UDP datagram in which the obtained source port number is specified as the UDP header, with an ESP header and another UDP header, so as to be able to communicate with the server 140.

Figure 2:
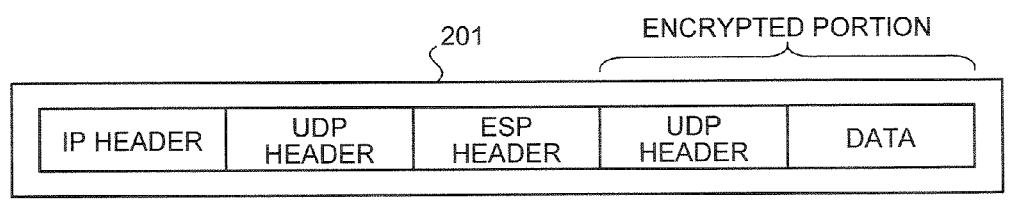
FIG. 2 is a drawing for explaining an example of a format of a packet transmitted and received according to the first embodiment.

As shown in FIG. 2, a packet 201 that is transmitted and received in a communication between the communication device 100 and the server 140 has a format that the data follows UDP header, the UDP payload is encrypted with ESP, the ESP payload follows another UDP header, and IP header is followed by it.

This format makes the device possible to communicate via NAT box 120 and also keep security level of communication, by encapsulating the packet which NAT box 120 cannot translate, with the protocol header which NAT box 120 can translate.

Figure 3:
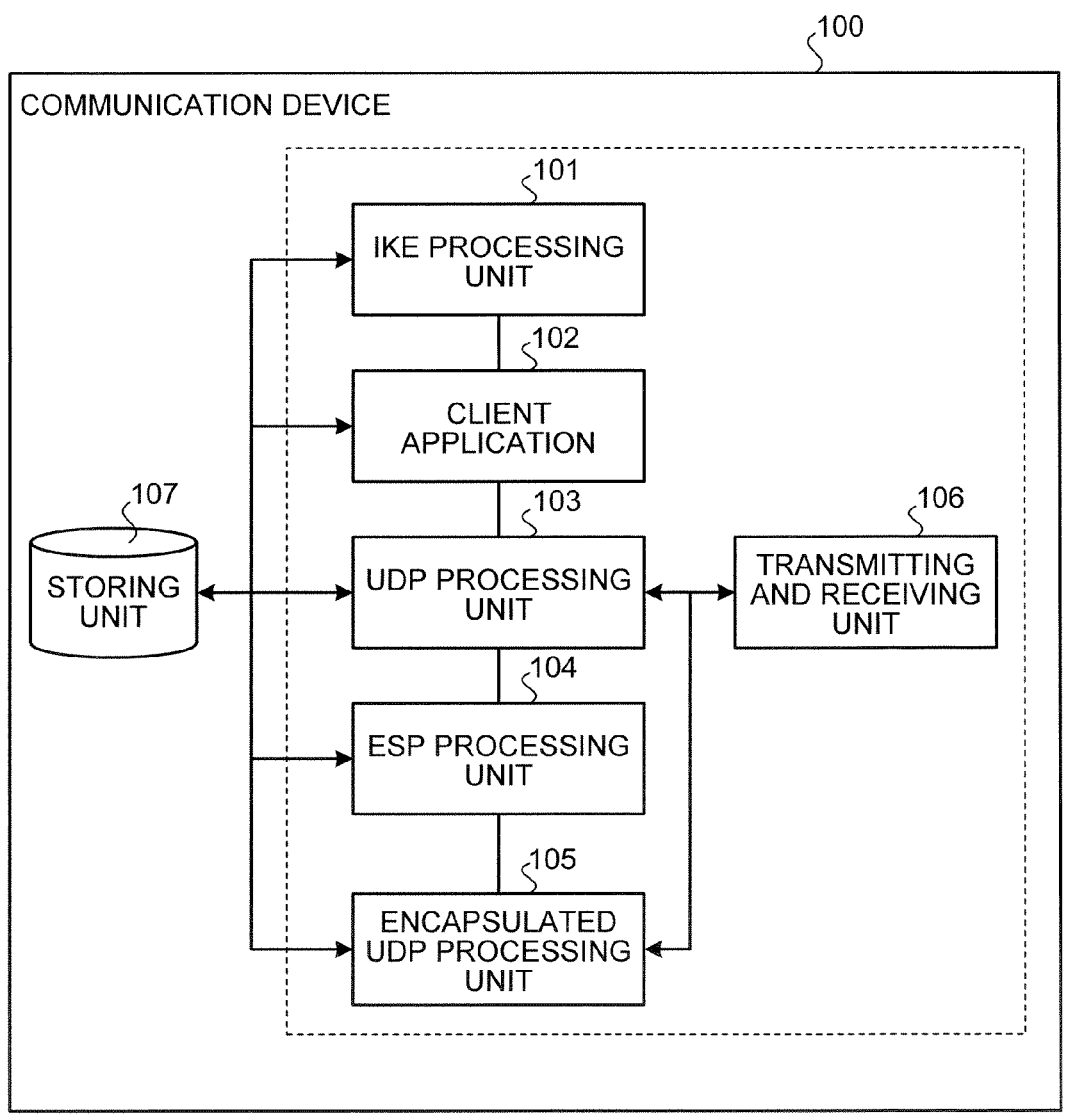
FIG. 3 is a block diagram of the communication device according to the first embodiment.

As shown in FIG. 3, the communication device 100 includes an IKE processing unit 101, a client application 102, a UDP processing unit 103, an ESP processing unit 104, an encapsulated UDP processing unit 105, a transmitting and receiving unit 106, and a storing unit 107.

The IKE processing unit 101 processes an IKE message which is a message transmitted to and received from the server 140 according to an IKE protocol. More specifically, to establish a security association, the IKE processing unit 101 generates an IKE message to establish security association for Internet Security Association Key Management Protocol (ISAKMP) and to require authentication.

Also, the IKE processing unit 101 passes the generated IKE message to the UDP processing unit 103 so that the IKE message is transmitted using the UDP, and also obtains, from an IKE message returned from the server 140, parameters to generate keys used in encryption and decryption and parameters required in generation and maintenance of the ISAKMP SA, and storing the key and the obtained parameters into the storing unit 107.

In addition, the IKE processing unit 101 obtains a NAT translated source port number from the IKE message that is generated and returned by the server 140 and has been extended so as to include the NAT translated source port number, and storing the obtained NAT translated source port number into the storing unit 107. With this arrangement in which the source port number stored in the storing unit 107 is used, it is possible to avoid miscommunication that may occur during the communication with the server 140.

The client application 102 is an application that performs a predetermined processing by communicating with a server application 142 in the server 140. More specifically, the client application 102 generates data used in the communication with the server 140, passes the generated data to the UDP processing unit 103, receives data returned from the serer 140 via the UDP processing unit 103, and performs the predetermined processing. The processing performed by the client application 102 may be any kind of processing as long as the processing includes a processing of communicating with the server application 142 included in the server 140.

The UDP processing unit 103 processes the UDP datagram transmitted to and received from the server 140 according to a UDP. More specifically, the UDP processing unit 103 appends a UDP header to the IKE message passed from the IKE processing unit 101 and passes the IKE message with the UDP header to the transmitting and receiving unit 106, and also appends a UDP header to data passed from the client application 102 and passes the data with the UDP header to the ESP processing unit 104.

Also, the UDP processing unit 103 deletes a UDP header from a UDP datagram passed from the ESP processing unit 104 and passes the UDP payload to the client application 102.

In addition, the UDP processing unit 103 deletes a UDP header from a UDP datagram received from the transmitting and receiving unit 106 so as to obtain a UDP payload and, if the UDP payload contains an ESP header, passes the UDP datagram received from the transmitting and receiving unit 106 to the encapsulated UDP processing unit 105. In other words, if the packet has been encapsulated with an ESP, the UDP processing unit 103 passes the UDP datagram to the encapsulated UDP processing unit 105 that processes the encapsulated packet.

When the UDP payload does not contain an ESP header, the UDP processing unit 103 passes the UDP payload to the IKE processing unit 101.

The ESP processing unit 104 encrypts data transmitted to and received from the server 140 according to an ESP protocol. More specifically, the ESP processing unit 104 encrypts the UDP datagram passed from the UDP processing unit 103, using a parameter such as a key used in the encryption process stored in the storing unit 107, appends an ESP header to the encrypted UDP datagram, and passes the encrypted UDP datagram with the ESP header to the encapsulated UDP processing unit 105.

Also, the ESP processing unit 104 decrypts an encrypted UDP datagram passed from the encapsulated UDP processing unit 105, using a parameter such as a key used in the decryption process stored in the storing unit 107 and passes the decrypted UDP datagram to the UDP processing unit 103.

The encapsulated UDP processing unit 105 generates a UDP datagram by further encapsulating, with a UDP header, the UDP datagram encrypted by the ESP processing unit 104 according to the UDP. The encapsulated UDP processing unit 105 also deletes a UDP header used for further encapsulating an encrypted UDP datagram, from a packet received from the server 140.

More specifically, the encapsulated UDP processing unit 105 appends a UDP header in which the source port number stored in the storing unit 107 is specified, to the UDP datagram encrypted with the ESP and passed from the ESP processing unit 104, and passes the UDP datagram with the UDP header to the transmitting and receiving unit 106.

In addition, the encapsulated UDP processing unit 105 deletes a UDP header used for further encapsulating the UDP datagram encrypted with the ESP and passes the UDP datagram to the ESP processing unit 104.

The transmitting and receiving unit 106 appends an IP header to the UDP datagram passed from either the UDP processing unit 103 or the encapsulated UDP processing unit 105, and transmits the UDP datagram with the IP header to the server 140. Also, the transmitting and receiving unit 106 passes a UDP payload obtained by deleting an IP header from a packet received from the server 140 to either the UDP processing unit 103 or the encapsulated UDP processing unit 105.

The storing unit 107 stores therein a source port number obtained after the NAT Box 120 performs a NAT translation, the key used in encryption and decryption processes, and the parameters required in the generation and the maintenance of the ISAKMP SA. The storing unit 107 may be configured with any storage device that is generally used, such as a Hard Disk Drive (HDD), an optical disc, a memory card, or a Random Access Memory (RAM).

Thus completes the description of the processing performed by the constituent elements of the communication device 100. Next, the configuration of the server 140 will be explained.

The server 140 establishes a security association with the communication device 100 according to an IKE protocol, and then transmits and receives an encrypted packet to and from the communication device 100.

Figure 4:
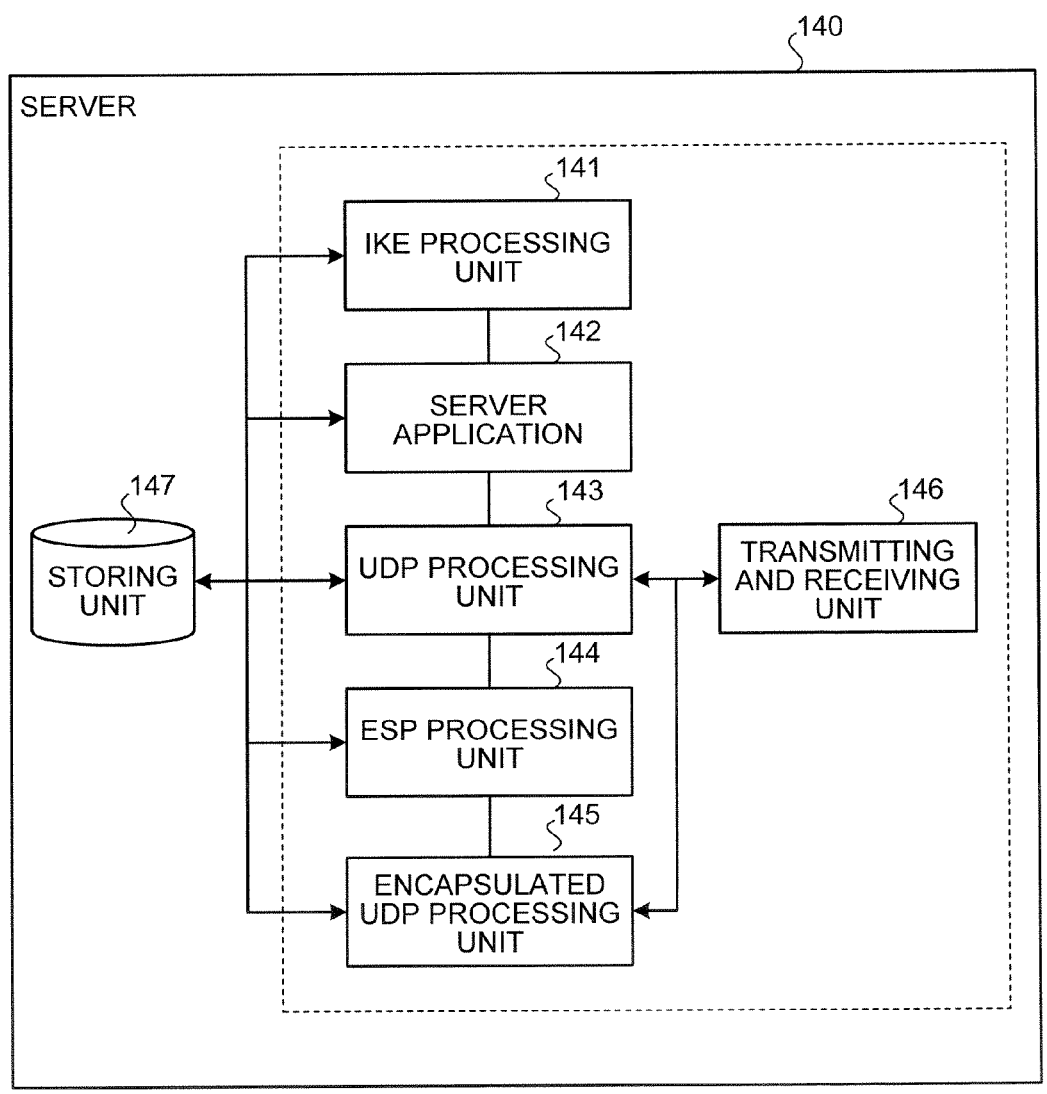
FIG. 4 is a block diagram of a server according to the first embodiment.

As shown in FIG. 4, the server 140 includes an IKE processing unit 141, the server application 142, a UDP processing unit 143, an ESP processing unit 144, an encapsulated UDP processing unit 145, a transmitting and receiving unit 146, and a storing unit 147.

Like the IKE processing unit 101 included in the communication device 100, the IKE processing unit 141 processes an IKE message transmitted to and received from the communication device 100 according to an IKE protocol. More specifically, to establish a security association, the IKE processing unit 141 generates an IKE message for establishing an ISAKMP SA or an IKE message for requesting authentication.

Also, the IKE processing unit 141 passes the generated IKE message to the UDP processing unit 143 so that the IKE message is transmitted using the UDP, and also obtains, from an IKE message transmitted from the communication device 100, parameters to generate keys used in encryption and decryption and parameters required in the generation and the maintenance of the ISAKMP SA and storing the obtained key and the obtained parameters into the storing unit 147.

In addition, the IKE processing unit 141 is different from the IKE processing unit 101 in that it obtains a source UDP port number of a UDP datagram that has been transmitted from the communication device 100 and performed a NAT translation, stores the obtained source UDP port number into the storing unit 147, generates an IKE message that is extended by appending the stored source port number, and transmits the generated IKE message to the communication device 100. The details of the extended IKE message will be described later.

The server application 142 is an application that performs a predetermined processing by communicating with the client application 102 included in the communication device 100. More specifically, the server application 142 generates data used in the communication with the communication device 100, passes the generated data to the UDP processing unit 143, receives data returned from the communication device 100 via the UDP processing unit 143, and performs the predetermined processing. The processing performed by the server application 142 may be any kind of processing as long as the processing includes a processing of communicating with the client application 102 included in the communication device 100.

The UDP processing unit 143 processes the UDP datagram transmitted to and received from the communication device 100 according to a UDP. More specifically, the UDP processing unit 143 appends a UDP header to the IKE message passed from the IKE processing unit 141 and passes the IKE message with the UDP header to the transmitting and receiving unit 146, and also appends a UDP header to data passed from the server application 142 and passes the data with the UDP header to the ESP processing unit 144.

Also, the UDP processing unit 143 deletes a UDP header from a UDP datagram passed from the ESP processing unit 144 and passes the UDP payload to the server application 142.

In addition, the UDP processing unit 143 deletes a UDP header from a UDP datagram received from the transmitting and receiving unit 146 so as to obtain a UDP payload and, if the UDP payload contains an ESP header, passes the UDP datagram received from the transmitting and receiving unit 146 to the encapsulated UDP processing unit 145. When the UDP payload does not contain an ESP header, the UDP processing unit 143 passes the UDP payload to the IKE processing unit 141.

The ESP processing unit 144 encrypts data transmitted to and received from the communication device 100 according to an ESP protocol. More specifically, the ESP processing unit 144 encrypts the UDP datagram passed from the UDP processing unit 143, using a parameter such as a key used in the encryption process stored in the storing unit 147, appends an ESP header to the encrypted UDP datagram, and passes the encrypted UDP datagram with the ESP header to the encapsulated UDP processing unit 145.

Also, the ESP processing unit 144 decrypts a packet passed from the encapsulated UDP processing unit 145, using a parameter such as a key used in the decryption process stored in the storing unit 147 and passes the decrypted packet to the UDP processing unit 143.

The encapsulated UDP processing unit 145 generates a UDP datagram by further encapsulating, with a UDP header, the UDP datagram encrypted by the ESP processing unit 144 according to the UDP. The encapsulated UDP processing unit 145 also deletes a UDP header used for further encapsulating a UDP datagram encrypted with the ESP, from a packet received from the communication device 100.

More specifically, the encapsulated UDP processing unit 145 appends a UDP header to the UDP datagram encrypted with the ESP and passed from the ESP processing unit 144, and passes the UDP datagram with the UDP header to the transmitting and receiving unit 146. In addition, the encapsulated UDP processing unit 145 deletes a UDP header used for further encapsulating the UDP datagram encrypted with the ESP and passes the UDP datagram to the ESP processing unit 144.

The transmitting and receiving unit 146 appends an IP header to a UDP datagram passed from either the UDP processing unit 143 or the encapsulated UDP processing unit 145 and transmits the UDP datagram with the IP header to the communication device 100. Also, the transmitting and receiving unit 146 passes a UDP datagram obtained by deleting an IP header from a packet received from the communication device 100 to either the UDP processing unit 143 or the encapsulated UDP processing unit 145.

The storing unit 147 stores therein the key used in encryption and decryption processes and the parameters required in the generation and the maintenance of the ISAKMP SA. The storing unit 147 may be configured with any storage device that is generally used, such as a Hard Disk Drive (HDD), an optical disc, a memory card, or a Random Access Memory (RAM).

Next, the communication processing performed between the communication device 100 and the server 140 according to the first embodiment that are configured as described above will be explained. The following explanation is based on an assumption that the communication device 100 and the server 140 perform a negotiation in the IKE phase 1, which is a processing for establishing a communication using the Aggressive mode of the IKE having an authentication function with an electronic signature. However, the Main mode of the IKE may be used. Also, the authentication method may be any other method besides the one using an electronic signature.

First, the communication device 100 proposes to the server 140 that an ISAKMP SA should be generated (step S501). More specifically, at step S501, the processing as described below is performed.

First, the IKE processing unit 101 generates an IKE message 701 that is an SA generation proposal message and passes the generated IKE message 701 to the UDP processing unit 103. The UDP processing unit 103 appends a UDP header in which the source port number and the destination port number are 500 to the IKE message 701 and passes the IKE message 701 with the UDP header to the transmitting and receiving unit 106. The transmitting and receiving unit 106 further appends an IP header in which the source IP address is C and the destination IP address is S to IKE message 701.

Figure 7:
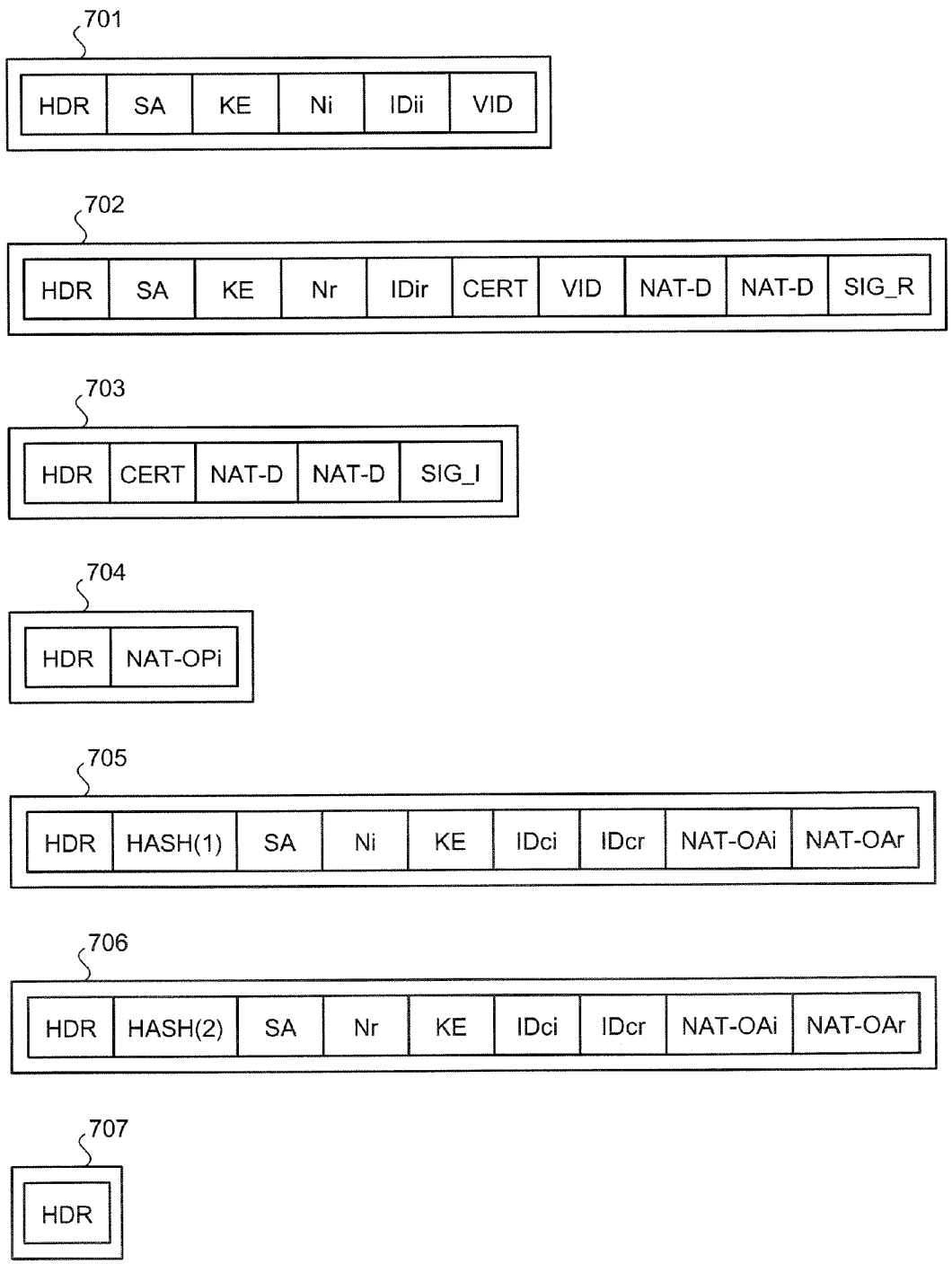
FIG. 7 is a drawing for explaining an example of a format of an IKE message transmitted and received according to the first embodiment.

The IKE message 701 is configured so as to be in a format that is in compliance with Document 2 in which the standard specification of the IKE protocol is defined. As shown in FIG. 7, the IKE message 701 includes an ISAKMP header (HDR), an SA payload (SA), a Key Exchange payload (KE), a Nonce payload (Ni), an ID payload (IDii), and a Vendor ID payload (VID).

The IKE message 701 to which the IP header has been appended at step S501 is transmitted to the NAT Box 120 by the transmitting and receiving unit 106 (step S502). The notation "(500→500)" written below step S502 denotes that the source port number is specified as 500, and also the destination port number is specified as 500 in the UDP header of the IKE message 701.

Figure 5:
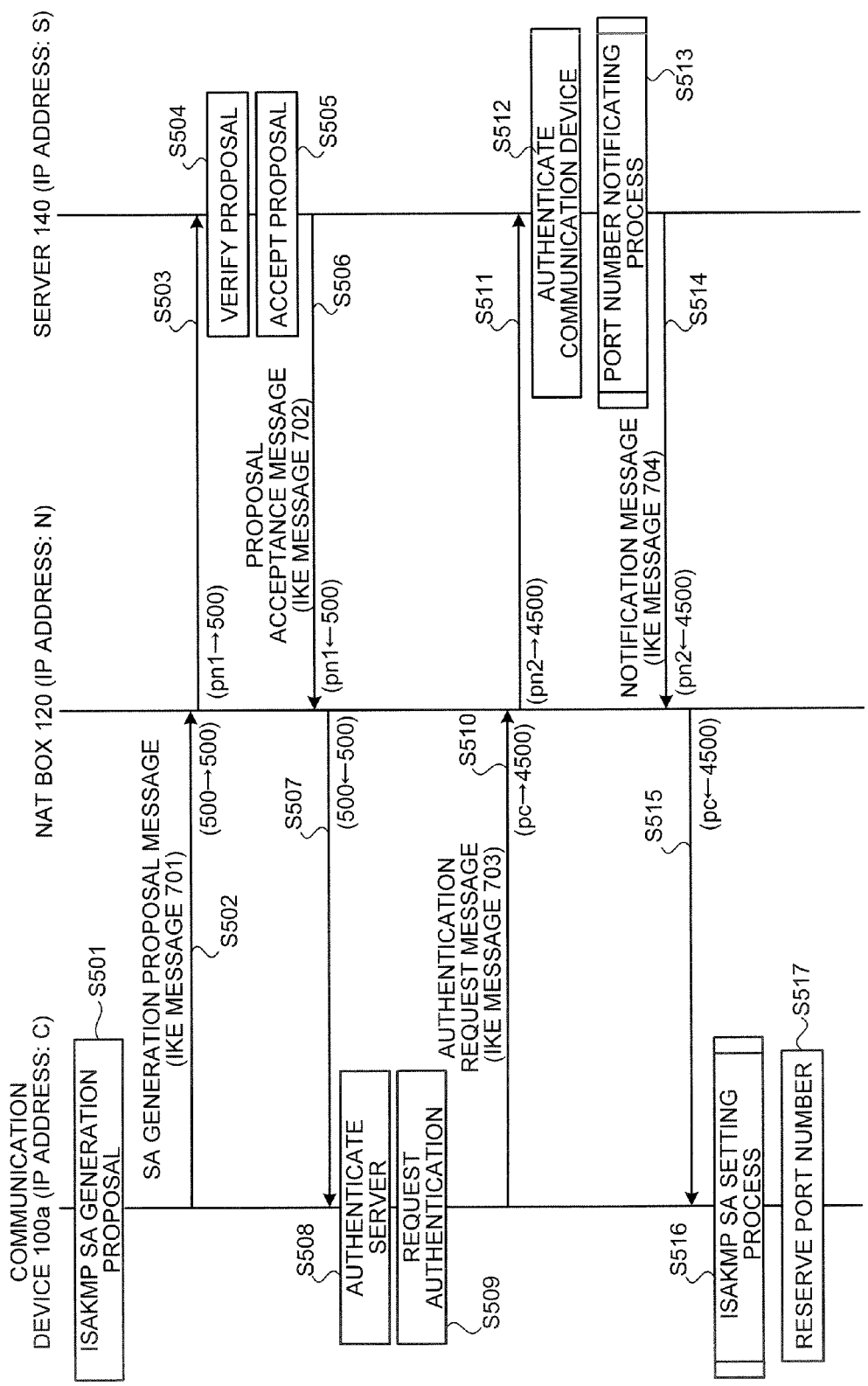
FIG. 5 is a sequence chart of an overall procedure in a communication processing according to the first embodiment.

Next, the NAT Box 120 receives the IKE message 701, performs a NAT translation on the IKE message 701, and forwards the message to the Internet 130 (step S503). As a result, the source IP address in the IKE message 701 has been translated into N. The source port number in the UDP header has been also translated as a result of the NAT translation. In FIG. 5, the source port number of the IKE message 701 after the NAT translation is performed is indicated as pn1. The NAT translated source port number may be the same as the port number before the NAT translation is performed.

Next, the server 140 verifies the ISAKMP SA generation proposal (step S504). More specifically, the processing as described below is performed at step S504.

First, the transmitting and receiving unit 146 receives the IKE message 701 and passes a UDP datagram, which is obtained by deleting the IP header from the IKE message 701, to the UDP processing unit 143. The UDP processing unit 143 deletes the UDP header from the passed UDP datagram so as to obtain a UDP payload. At the stage of ISAKMP SA generation proposal, no encryption process with an ESP is performed. In other words, the UDP payload does not contain an ESP header. Thus, the UDP processing unit 143 passes the UDP payload to the IKE processing unit 141. The IKE processing unit 141 verifies the passed IKE message 701 and determines whether the proposal indicated in the IKE message 701 should be accepted.

When the proposal is to be accepted, the server 140 performs a proposal acceptance processing (step S505). More specifically, the processing as described below is performed at step S505.

First, to notify the parameter required in the establishment of the ISAKMP SA to the communication device 100, the IKE processing unit 141 generates an IKE message 702 and passes the generated IKE message 702 to the UDP processing unit 143. The UDP processing unit 143 appends a UDP header in which the source port number is 500 and the destination port number is pn1 to the IKE message 702 and passes the IKE message 702 with the UDP header to the transmitting and receiving unit 146. The transmitting and receiving unit 146 appends an IP header in which the source IP address is S and the destination IP address is N to the passed IKE message 702.

As shown in FIG. 7, the IKE message 702 includes an ISAKMP header (HDR), a SA payload (SA), a Key Exchange payload (KE), a Nonce payload (Nr), an ID payload (IDir), a Cert payload (CERT), a Vendor ID payload (VID), two NAT-D payloads (NAT-D), and a SIGNATURE payload (SIG_I).

The IKE message 702 to which the IP header has been appended at step S505 is transmitted to the NAT Box 120 via the Internet 130 by the transmitting and receiving unit 146 (step S506).

Next, the NAT Box 120 receives the IKE message 702, performs a NAT translation on the IKE message 702, and forwards the translated message to the communication device 100 (step S507). As a result, the destination IP address in the IKE message 702 has been translated into C, and also the destination port number has been translated into 500.

Next, the communication device 100 performs an authentication processing of the server (step S508). More specifically, the processing as described below is performed at step S508.

First, the transmitting and receiving unit 106 receives the IKE message 702 and passes a UDP datagram, which is obtained by deleting the IP header from the IKE message 702, to the UDP processing unit 103. The UDP processing unit 103 deletes the UDP header from the passed UDP datagram so as to obtain a UDP payload. Because the UDP payload does not contain an ESP header, the UDP processing unit 103 passes the UDP payload to the IKE processing unit 101. The IKE processing unit 101 verifies that the message has been received from the server 140, using the SIGNATURE payload in the passed IKE message 702 or the like. Further, the IKE processing unit 101 stores, into the storing unit 107, the parameter required in the generation of the ISAKMP SA included in the IKE message 702.

Next, the communication device 100 performs an authentication request processing to request the server 140 that the communication device 100 should be authenticated (step S509). More specifically, the processing as described below is performed at step S509.

First, the IKE processing unit 101 obtains, from the UDP processing unit 103, the UDP port number, namely pc, that is not used by other applications in the communication device 100, generates an IKE message 703, and passes the generated IKE message 703 to the UDP processing unit 103. The UDP processing unit 103 appends a UDP header in which the source port number is pc and the destination port number is 4500 to the passed IKE message 703, and passes the IKE message 703 with the UDP header to the transmitting and receiving unit 106. The transmitting and receiving unit 106 appends an IP header in which the source IP address is C and the destination IP address is S to the passed IKE message 703.

As shown in FIG. 7, the IKE message 703 includes an ISAKMP header (HDR), a Cert payload (CERT), two NAT-D payloads (NAT-D), and a SIGNATURE payload (SIG_I).

The IKE message 703 to which the IP header has been appended at step S509 is transmitted to the NAT Box 120 by the transmitting and receiving unit 106 (step S510).

Next, the NAT Box 120 receives the IKE message 703, performs a NAT translation on the IKE message 703, and forwards the translated message to the Internet 130 (step S511). As a result, the source IP address in the IKE message 703 has been translated into N. The source port number in the UDP header has been also translated as a result of the NAT translation. In FIG. 5, the source port number in the IKE message 703 after the NAT translation is performed is indicated as pn2. The NAT translated source port number may be the same as the port number before the NAT translation is performed.

Next, the server 140 performs an authentication processing of the communication device 100 (step S512). More specifically, the processing as described below is performed at step S512.

First, the transmitting and receiving unit 146 receives the IKE message 703 and passes a UDP datagram, which is obtained by deleting the IP header from the IKE message 703, to the UDP processing unit 143. The UDP processing unit 143 deletes the UDP header from the passed UDP datagram so as to obtain a UDP payload. Because the UDP payload does not contain an ESP header, the UDP processing unit 143 passes the UDP payload to the IKE processing unit 141. The IKE processing unit 141 verifies that the message has been received from the communication device 100, using the SIGNATURE payload in the passed IKE message 703 or the like.

When the message has been verified properly, the server 140 performs a port number notification processing to notify the source port number in the UDP header to the communication device 100 (step S513). The details of the port number notification processing will be described later.

As a result of the port number notification processing, an IKE message 704 is transmitted to the NAT Box 120 via the Internet 130 (step S514). The format of the IKE message 704 will be described later.

Next, the NAT Box 120 receives the IKE message 704, performs a NAT translation on the IKE message 704, and forwards the translated message to the communication device 100 (step S515). As a result, the destination IP address in the IKE message 704 has been translated into C, and also the destination port number has been translated into pc.

Next, the communication device 100 performs an ISAKMP SA setting processing (step S516). The details of the ISAKMP SA setting processing will be described later.

Next, the client application 102 included in the communication device 100 performs a port number reservation processing in which the client application 102 requests the UDP processing unit 103 that the source port number pn2 stored in the storing unit 107 be used (step S517).

If any of the programs executed in the communication device 100 uses pn2 as a port number in a UDP header, the UDP processing unit 103 rejects the request asking for permission to use the source port number pn2. In this situation, the processing is performed all over again, starting from the ISAKMP SA generation proposal processing at step S501. In the processing for the second time, a different port number pc is obtained at step S509. Thus, it is possible to obtain a port number that is different from pn2, which was obtained the first time, and to ask for permission to use the port number once again. Another arrangement is also acceptable in which the client application 102 is notified that the request is rejected so that the sequence is ended.

On the other hand, when the port number pn2 is usable, the communication device 100 performs an IPSec SA generation proposal processing to notify the parameter required in the communication using a packet encrypted with an ESP (step S518). More specifically, the processing as described below is performed at step S518.

First, the client application 102 notifies the IKE processing unit 101 that the negotiation with the server 140 will be continued. The IKE processing unit 101 stores, into the storing unit 107, the parameters required in the communication using the packet encrypted with the ESP, generates an IKE message 705, and passes the generated IKE message 705 to the UDP processing unit 103. The UDP processing unit 103 appends a UDP header in which the source port number is pc and the destination port number is 4500 to the passed IKE message 705 and passes the IKE message 705 with the UDP header to the transmitting and receiving unit 106. The transmitting and receiving unit 106 appends an IP header in which the source IP address is C and the destination IP address is S to the passed IKE message 705.

As shown in FIG. 7, the IKE message 705 includes an ISAKMP header (HDR), a HASH payload (HASH(1)), an SA payload (SA), a Nonce payload (Ni), a Key Exchange payload (KE), two ID payloads (IDci and IDcr), and two NAT-OA payloads (NAT-OAi and NAT-OAr).

The IKE message 705 to which the IP header has been appended at step S518 is transmitted to the NAT Box 120 by the transmitting and receiving unit 106 (step S519).

Next, the NAT Box 120 receives the IKE message 705, performs a NAT translation on the IKE message 705, and forwards the translated message to the server 140 (step S520). As a result, the source IP address in the IKE message 705 has been translated into N, and also the source port number has been translated into pn2.

Next, the server 140 verifies the IPSec SA generation proposal (step S521). More specifically, the processing as described below is performed at step S521.

First, the transmitting and receiving unit 146 receives the IKE message 705 and passes a UDP datagram, which is obtained by deleting the IP header from the IKE message 705, to the UDP processing unit 143. The UDP processing unit 143 deletes the UDP header from the passed UDP datagram so as to obtain a UDP payload. Because the UDP payload does not contain an ESP header, the UDP processing unit 143 passes the UDP payload to the IKE processing unit 141. The IKE processing unit 141 verifies the contents of the proposal written in the passed IKE message 705. When the proposal is to be accepted, the IKE processing unit 141 stores, into the storing unit 147, the parameters required in the communication using the packet encrypted with the ESP written in the IKE message 705.

When the proposal has been verified properly, the server 140 performs a parameter notification processing to notify the parameter required in the establishment of an IPSec SA to the communication device 100 (step S522). More specifically, the processing as described below is performed at step S522.

First, the IKE processing unit 141 generates an IKE message 706 and passes the generated IKE message 706 to the UDP processing unit 143. The UDP processing unit 143 appends a UDP header in which the source port number is 4500 and the destination port number is pn2 to the IKE message 706 and passes the IKE message 706 with the UDP header to the transmitting and receiving unit 146. The transmitting and receiving unit 146 appends an IP header in which the source IP address is S and the destination IP address is N to the passed IKE message 706.

As shown in FIG. 7, the IKE message 706 includes an ISAKMP header (HDR), a HASH payload (HASH (2)), an SA payload (SA), a Nonce payload (Nr), a Key Exchange payload (KE), two ID payloads (IDci and IDcr), and two NAT-OA payloads (NAT-OAi and NAT-OAr).

The IKE message 706 to which the IP header has been appended at step S522 is transmitted to the NAT Box 120 via the Internet 130 by the transmitting and receiving unit 146 (step S523).

Next, the NAT Box 120 receives the IKE message 706, performs a NAT translation on the IKE message 706, and forwards the translated message to the communication device 100 (step S524). As a result, the destination IP address in the IKE message 702 has been translated into C, and also the destination port number has been translated into pc.

Next, the communication device 100 performs an IPSec SA setting processing (step S525). More specifically, the processing as described below is performed at step S525.

First, the transmitting and receiving unit 106 receives the IKE message 706 and passes a UDP datagram, which is obtained by deleting the IP header from the IKE message 706, to the UDP processing unit 103. The UDP processing unit 103 deletes the UDP header from the passed UDP datagram so as to obtain a UDP payload. Because the UDP payload does not contain an ESP header, the UDP processing unit 103 passes the UDP payload to the IKE processing unit 101. The IKE processing unit 101 verifies the passed IKE message 706, and stores, into the storing unit 107, the parameter required in the establishment of the IPSec SA written in the IKE message 706.

As a result of the processing described above, the preparation to allow the communication device 100 to communicate with the server 140, using the packet encrypted with the ESP is completed.

Subsequently, the communication device 100 performs an ESP packet generation processing in which a packet that is encrypted with an ESP and is to be transmitted to the server 140 is generated (step S526). The details of the ESP packet generation processing will be described later.

Next, the ESP packet generated in the ESP packet generation processing will be explained.

Figure 8:
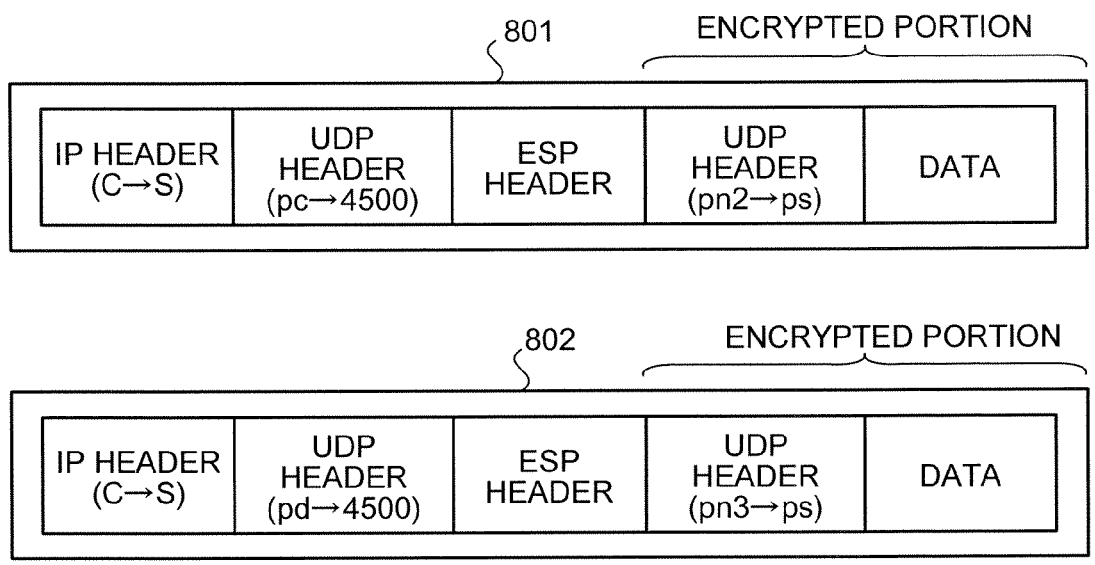
FIG. 8 is a drawing for explaining an example of an ESP packet transmitted and received according to the first embodiment.

An ESP packet 801 shown at the top of FIG. 8 is, for example, a packet in which the port number pn2 obtained by the communication device 100*a* is specified as the source port number in the UDP header. An ESP packet 802 shown at the bottom of FIG. 8 is, for example, a packet in which the port number pn3 obtained by the communication device 100*b*, which is different from the communication device 100*a*, is specified as the source port number in the UDP header.

The ESP packet generated in the ESP packet generation processing is transmitted to the NAT Box 120 by the transmitting and receiving unit 106 (step S527).

Next, the NAT Box 120 receives the ESP packet, performs a NAT translation on the ESP packet, and forwards the translated ESP packet to the server 140 (step S528). The IP address in the ESP packet and the port number in the outermost UDP header are the same as the ones in the IKE message 703 and the IKE message 705. Thus, like when a NAT translation is performed on the IKE message 703 and the IKE message 705, the destination IP address in the ESP packet is translated into N, and also the destination port number is translated into pn2.

Next, the server 140 performs a reception processing of the ESP packet (step S529). More specifically, the processing as described below is performed at step S529.

First, the transmitting and receiving unit 146 receives the ESP packet and passes a UDP datagram, which is obtained by deleting the IP header from the ESP packet, to the UDP processing unit 143. The UDP processing unit 143 deletes the UDP header from the passed UDP datagram so as to obtain a UDP payload. In this situation, because the UDP payload contains an ESP header, the UDP processing unit 143 passes the UDP datagram to the encapsulated UDP processing unit 145. The encapsulated UDP processing unit 145 deletes the UDP header from the passed UDP datagram and passes the UDP payload to the ESP processing unit 144. The ESP processing unit 144 decrypts the encrypted UDP datagram and passes the decrypted UDP datagram to the UDP processing unit 143. The UDP processing unit 143 passes the data contained in the ESP packet to the server application 142, the data having the source IP address as N and the source port number as pn2.

As a result of the processing described above, the communication device 100 is able to communicate with the server 140 using the packet encrypted with the ESP.

Figure 9:
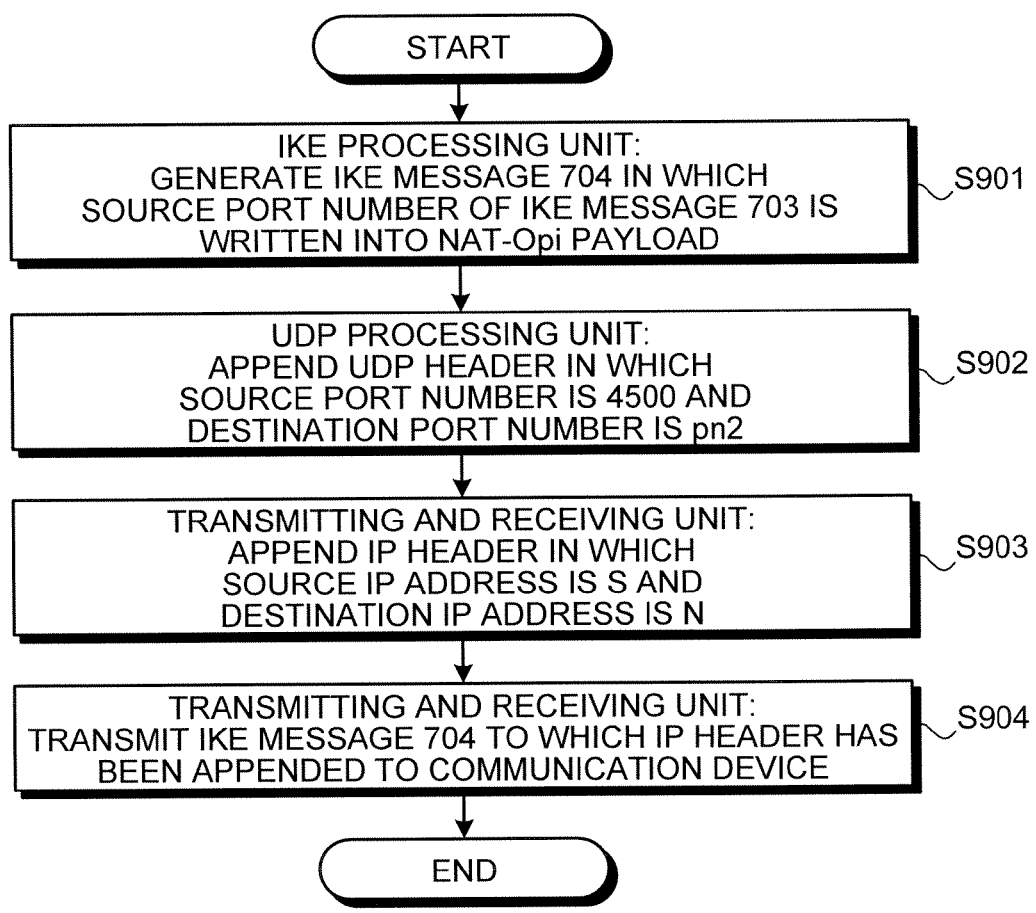
FIG. 9 is a flowchart of an overall procedure in a port number notification processing.

Next, the details of the port number notification processing performed at step S513 will be described based on FIG. 9.

First, to notify the source port number pn2 in the NAT-translated IKE message 703 to the communication device 100, the IKE processing unit 141 included in the server 140 generates the IKE message 704 in which the source port number pn2 is written (step S901).

As shown in FIG. 7, the IKE message 704 includes an ISAKMP header (HDR) and also has a field that is extended so that the source port number in the UDP header can be written. According to the first embodiment, the extended field is considered as a new payload and expressed as NAT-OPi.

At step S901, the IKE processing unit 141 writes pn2 into NAT-OPi in the IKE message 704. Another arrangement is also acceptable in which no new payload is defined, and the port number is written into an unused field in an existing payload.

Next, the UDP processing unit 143 appends a UDP header in which the source port number is 4500 and the destination port number is pn2 (step S902).

Subsequently, the transmitting and receiving unit 146 appends an IP header in which the source IP address is S and the destination IP address is N, to the IKE message 704 (step S903). The transmitting and receiving unit 146 then transmits the IKE message 704 with the IP header to the communication device 100 via the Internet 130 (step S904).

With this arrangement in which the NAT translated source port number pn2 is notified to the communication device 100 by the server 140, it is possible for the communication device 100 to specify the notified port number pn2 as the source port number of the UDP datagram that is encapsulated with the ESP. Thus, the server application 142 in the server 140 that has received the UDP datagram encapsulated with the ESP is able to have a communication properly, using the source port number (pn2) contained in the decrypted UDP datagram, without having to perform a processing to replace the source port number or the like.

Figure 10:
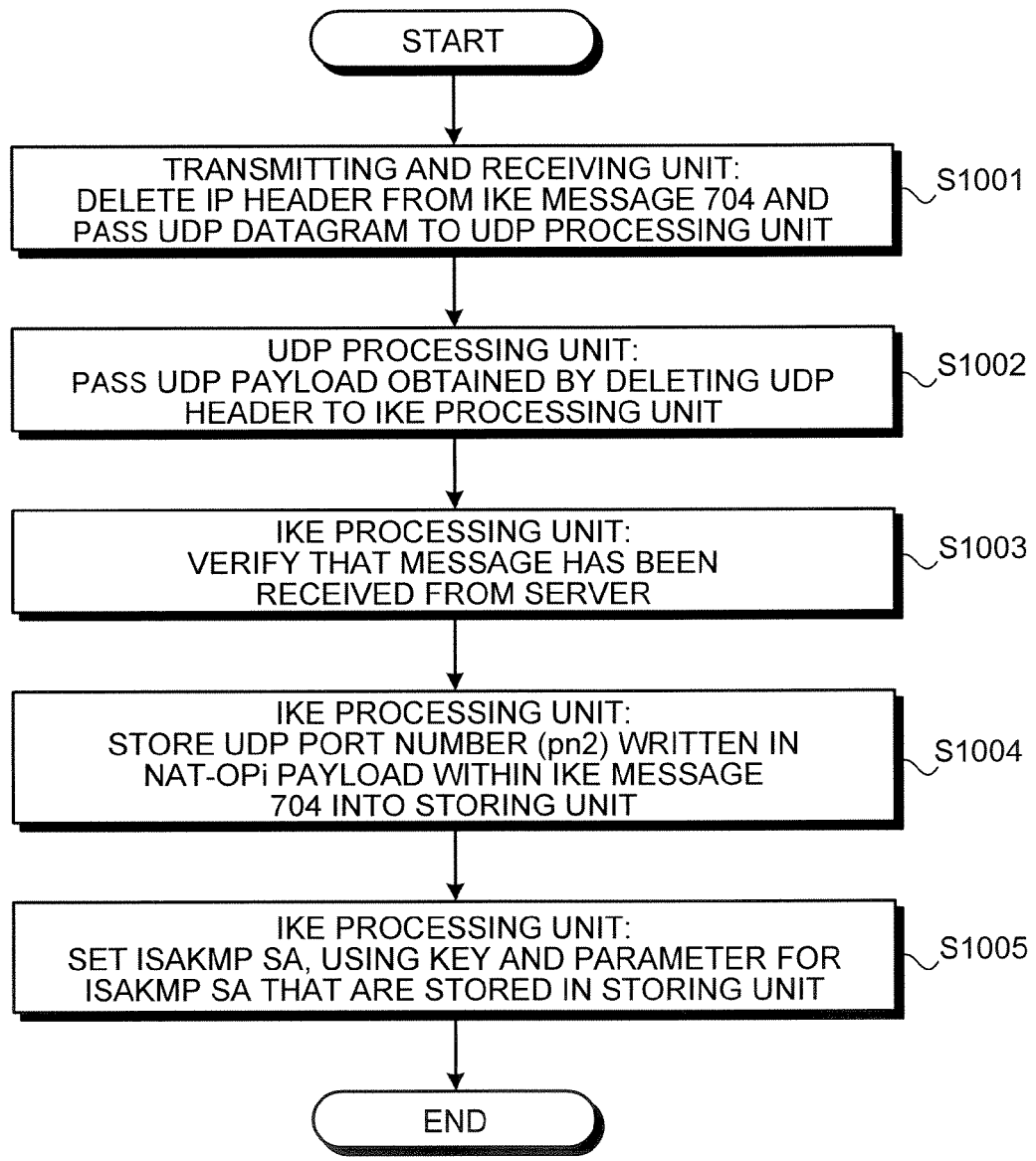
FIG. 10 is a flowchart of an overall procedure in an ISAKMP SA setting processing according to the first embodiment.

Next, the details of the ISAKMP SA setting processing performed at step S516 will be described based on FIG. 10.

First, the transmitting and receiving unit 106 in the communication device 100 receives the IKE message 704 and passes a UDP datagram, which is obtained by deleting the IP header from the IKE message 704, to the UDP processing unit 103 (step S1001).

Next, the UDP processing unit 103 deletes the UDP header from the passed UDP datagram and passes the UDP payload to the IKE processing unit 101 (step S1002). The reason is because the UDP payload does not contain an ESP header in this situation.

Next, the IKE processing unit 101 verifies that the message has been received from the server 140, using the SIGNATURE payload or the like (step S1003). Further, the IKE processing unit 101 stores, into the storing unit 107, the source port number (pn2) in the UDP header written in the NAT-OPi payload included in the IKE message 704 (step S1004).

Subsequently, the IKE processing unit 101 reads the parameter required in the generation of the ISAKMP SA that has been stored into the storing unit 107 at step S508, sets an ISAKMP SA with the read parameter, and notifies the client application 102 that the setting of the ISAKMP SA has been completed (step S1005).

As described above, in the ISAKMP SA setting processing, the ISAKMP SA is set by using the parameter that has been stored in advance, and also the source port number (pn2) obtained from the extended IKE message 704 is stored into the storing unit 107. Thus, it is possible to use the obtained source port number during the ESP packet generation processing, which is described later.

Figure 11:
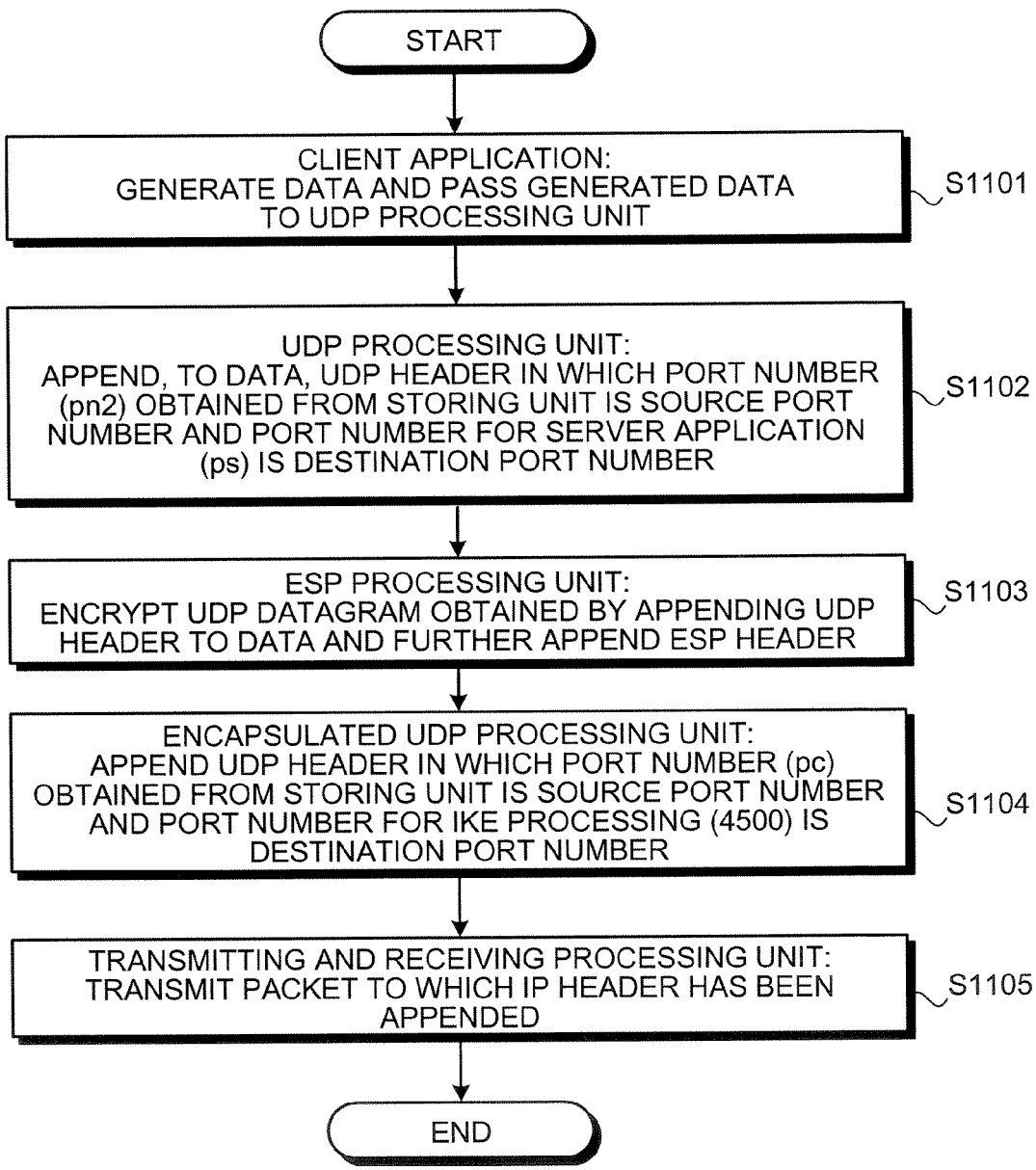
FIG. 11 is a flowchart of an overall procedure in an ESP packet generation processing according to the first embodiment.

Next, the details of the ESP packet generation processing performed at step S526 will be described based on FIG. 11.

First, the client application 102 in the communication device 100 generates data required in the communication with the server application 142 included in the server 140 and passes the generated data to the UDP processing unit 103 (step S1101).

Next, the UDP processing unit 103 obtains a port number (pn2) from the storing unit 107 and appends, to the passed data, a UDP header in which the obtained port number (pn2) is specified as the source port number, and the port number for the server application 142 (i.e. ps) is specified as the destination port number (step S1102).

Subsequently, the ESP processing unit 104 encrypts the UDP datagram obtained by appending a UDP header to the data, with the parameter stored in the storing unit 107 and further appends an ESP header to the encrypted UDP datagram (step S1103).

Next, the encapsulated UDP processing unit 105 appends a UDP header in which the port number, namely pc, stored in the storing unit 107 is specified as the source port number and the port number for the IKE processing, namely 4500, is specified as the destination port number (step S1104).

The transmitting and receiving unit 106 appends an IP header in which the source IP address is C and the destination IP address is S so as to generate an ESP packet 801 as shown in FIG. 8. The transmitting and receiving unit 106 then transmits the ESP packet 801 to the NAT Box 120 (step S1105).

As a result of the processing as described above, for example, even if another communication device 100b under the NAT Box 120 attempts to have a communication with the port number for the UDP, namely ps, in the server 140, using a packet encrypted with the ESP, the communication devices 100a and 100b are able to communicate with the server 140 simultaneously without any miscommunication. The reason will be explained below.

Because of a characteristic of the NAT Box 120, when multiple communication devices under the NAT Box 120 and each of the devices transmits a packet to the same UDP port in the one server 140 on the Internet 130, the source port numbers obtained after the NAT Box 120 performs NAT translations will be different from each other.

Figure 6:
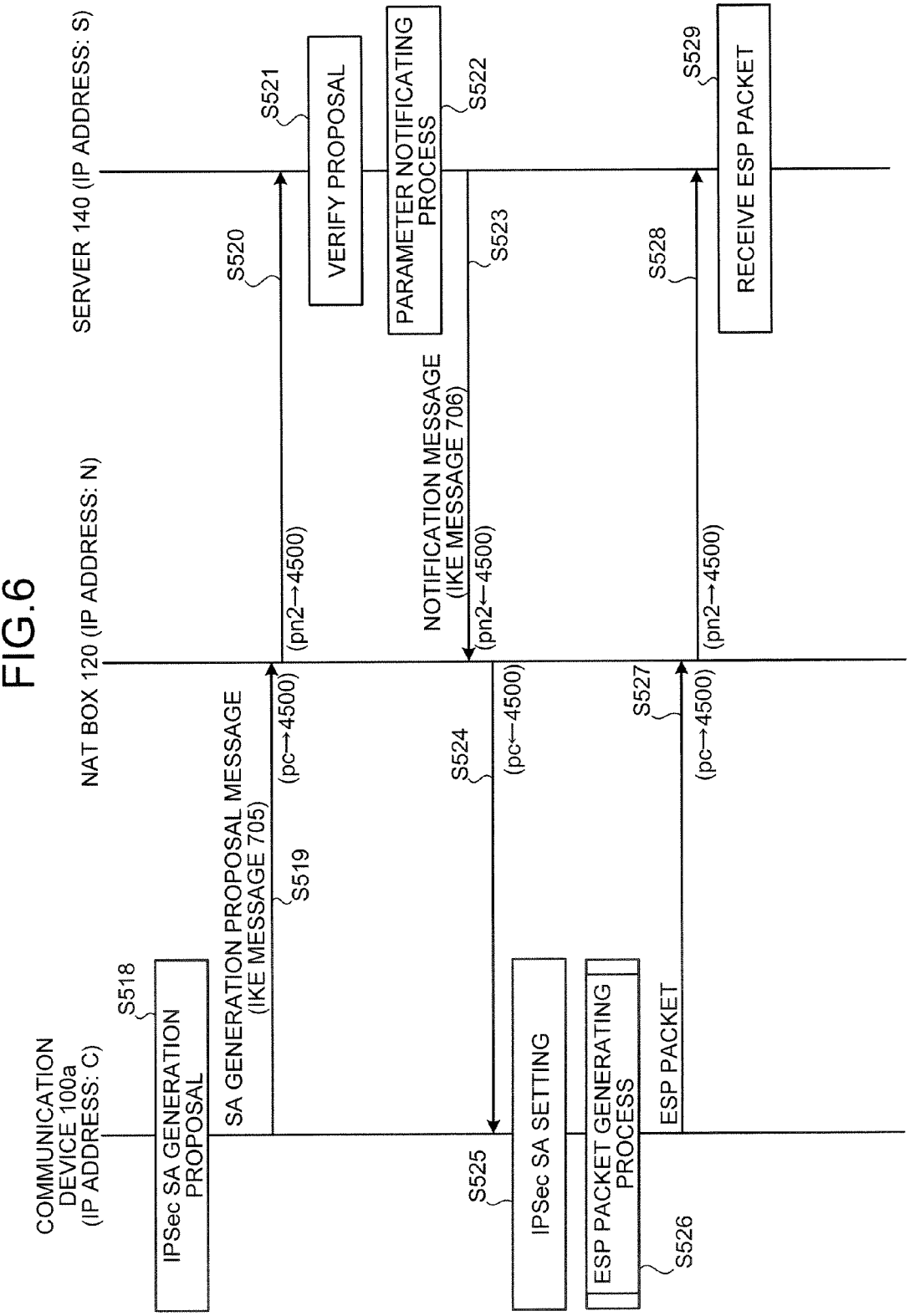
FIG. 6 is a sequence chart of an overall procedure in the communication processing according to the first embodiment.

When the communication device 100b performs the same processing as the one shown in the sequence charts in FIG. 5 and FIG. 6 and transmits an IKE message to the port number for the UDP (i.e. 4500) in the server 140, the NAT Box 120 performs a NAT translation on the IKE message with a source port number that is different from the port number translated from the message transmitted by the communication device 100a.

When the source port number in the UDP header before the NAT translation is performed for the communication device 100b is expressed as pd, and the source port number in the UDP header after the NAT translation is performed is expressed as pn3, the packet transmitted by the communication device 100b will be the ESP packet 802 shown in FIG. 8. As shown in FIG. 8, the source port numbers in the UDP datagrams encrypted with the ESP in the ESP packet 801 transmitted by the communication device 100a and the ESP packet 802 transmitted by the communication device 100b are pn2 and pn3, respectively. These port numbers are always different from each other.

Accordingly, the server application 142 included in the server 140 is able to recognize that the packets transmitted from the communication device 100a and the communication device 100b are packets transmitted from mutually different communication devices. Thus, the server 140 is able to communicate with the communication device 100a and the communication device 100b simultaneously, without having any miscommunication.

In the processing described above, the extended IKE is used as a key exchange protocol; however, it is acceptable to use any other protocol, as long as it is possible to notify the source port number when the information is exchanged.

In addition, in the case that the server 140 itself has a function to avoid having miscommunication, another arrangement is acceptable in which the server 140 gives a message to the communication device 100 indicating that it is possible to use a port number other than the port number pn as the source port number in the UDP header that is encapsulated with the ESP.

In such a situation, the IKE processing unit 141 in the server 140 writes the message mentioned above into an IKE message to be transmitted so that the IKE message is transmitted to the communication device 100 by the UDP processing unit 143 and the transmitting and receiving unit 146. The communication device 100 receives the IKE message and makes an arrangement so that the source port number reserved at step S517 is not pn2.

As described above, when the communication device according to the first embodiment is used, the NAT translated source port number is received from the server on the Internet, and it is possible to communicate with the server while the received source port number is specified as the source port number according to the protocol being encapsulated with the encryption protocol. Thus, the application included in the server is able to communicate with multiple devices under the network forwarding device, without having any miscommunication caused by the encapsulation. In addition, because it is not necessary for the server to perform the processing of replacing the source port number or the like, it is possible to perform the communication while miscommunication is avoided, without increasing the processing load of the server.

The communication device according to a second embodiment receives a NAT translated source port number from a Simple Traversal of UDP through NATs (STUN) server. The STUN server is an address information providing device that provides information related to addresses including source port numbers. The communication device then specifies the received source port number as the source port number in the UDP header encapsulated with an ESP so as to be able to communicate with the server.

Figure 12:
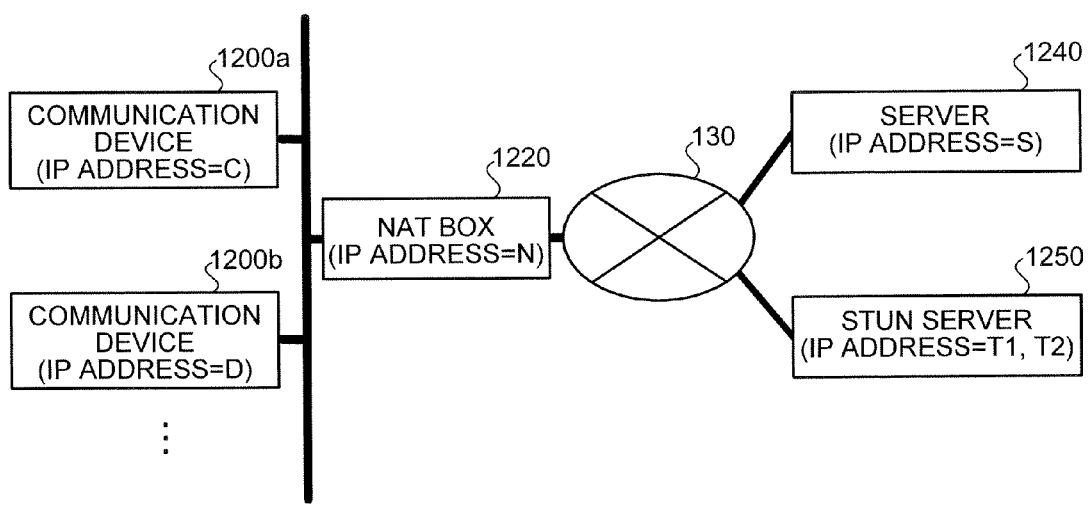
FIG. 12 is a block diagram of an entire network that includes a communication device according to a second embodiment.

As shown in FIG. 12, the network according to the second embodiment is configured so that the communication device 1200 is connected to the Internet 130 via a NAT Box 1220 and communicates with a server 1240 and a STUN server 1250, which are communication partners being connected to the Internet 130.

In the drawing, two communication devices 1200a and 1200b to which mutually different private IP addresses, namely C and D, are assigned are shown; however these two communication devices have the same functions and the same configuration. Thus, the communication devices 1200a and 1200b will be collectively referred to as the communication device 1200. A global IP address S is assigned to the server 1240. Global IP addresses T1 and T2 are assigned to the STUN server 1250.

Like the NAT Box 120 according to the first embodiment, the NAT Box 1220 is a network forwarding device that has a NAT translation function. The global IP address N is assigned to a network interface of the NAT Box 1220 on the side connected to the Internet 130.

The second embodiment is based on a premise that the NAT Box 1220 is a Cone NAT. A Cone NAT translates a source IP address and a source port number into values dependent on only a transfer protocol, a source IP address, and a source port number.

Thus, as long as the communication device 1200 uses same transport protocol, same source IP address and same port number to communicate with the server 120 and the STUN server, the NAT translated source port number is the same value for both of the server 1240 and the STUN server 1250. Accordingly, it is possible to transmit and receive a packet properly even if the communication device 1200 communicates with the server 1240, using the NAT translated source port number that is notified by the STUN server 1250.

On the other hand, if the NAT Box is a Symmetric NAT that translates an address while the destination IP address or the like is taken into consideration, there is a possibility that the NAT translated source port number may be changed depending on the devices which communicate with. Accordingly, when the communication device 1200 communicates with the server 1240 using the NAT translated source port number that is notified by the STUN serer 1250, there is a possibility that the communication is not performed properly.

According to the second embodiment, because the communication device 1200 communicates with the server 1240 using the NAT translated source port number that has been notified by the STUN server 1250 in advance, the NAT Box 1220 needs to be a Cone NAT.

The communication device 1200 establishes a security association with the server 1240 according to an IKE protocol, obtains a NAT-translated source port number in the UDP header from the STUN server 1250, and generates a packet by encapsulating, with an ESP header and another UDP header, a UDP datagram in which the obtained source port number is specified into the UDP header, so as to be able to communicate with the server 1240.

As explained above, the communication device 1200 according to the second embodiment is different from the communication device 100 according to the first embodiment in that it receives the NAT translated source port number from the STUN server 1250 that provides the address information, not from the server 1240.

According to the first embodiment, the IKE message is extended, and the server 140 returns the NAT translated source port number. However, according to the second embodiment, the IKE message does not have to be extended. Accordingly, it is sufficient if the server 1240 operates according to the standard protocol disclosed in Document 1 and Document 2. Thus, the server 1240 does not need to have any extra function.

Figure 13:
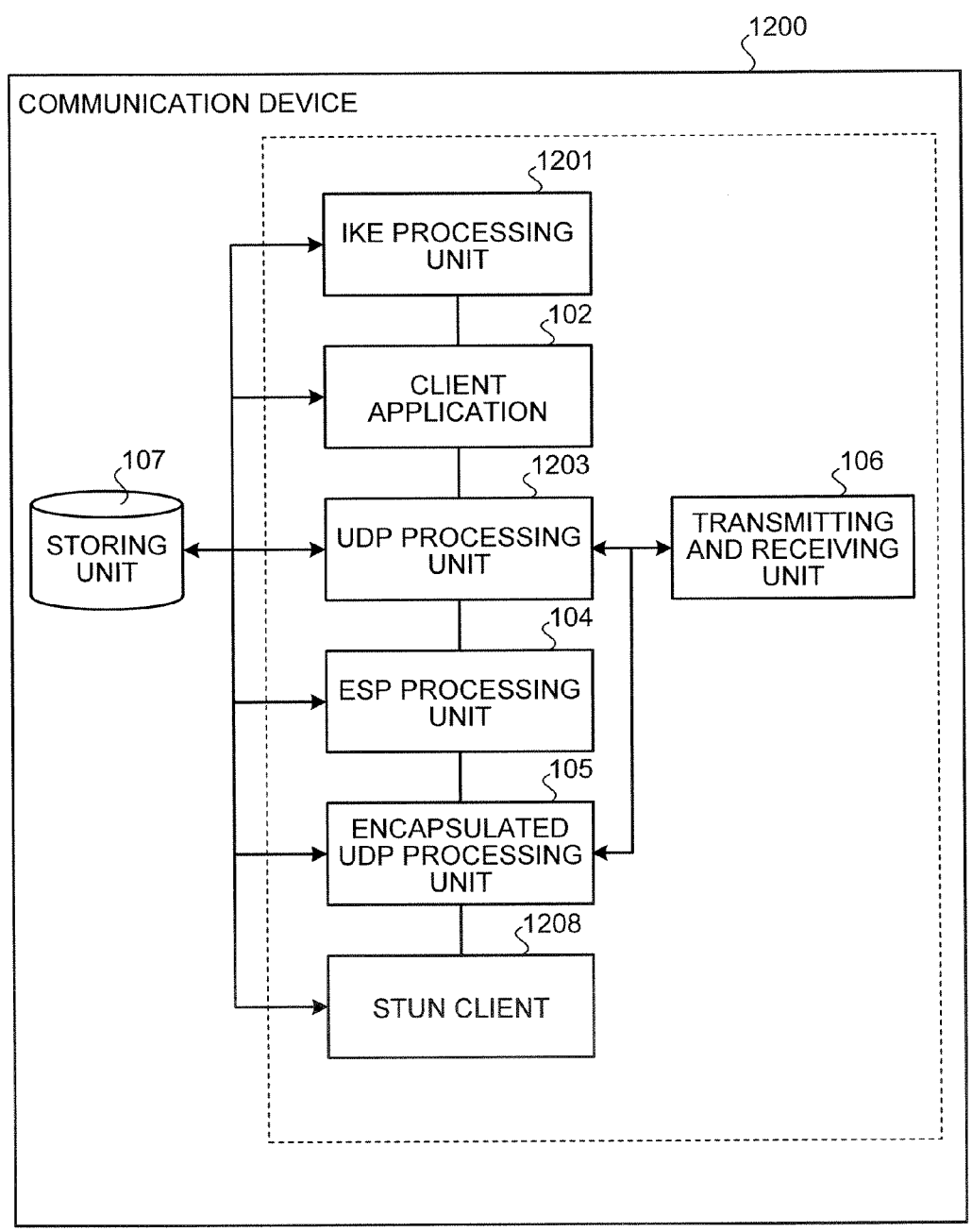
FIG. 13 is a block diagram of the communication device according to the second embodiment.

As shown in FIG. 13, the communication device 1200 includes an IKE processing unit 1201, the client application 102, a UDP processing unit 1203, the ESP processing unit 104, the encapsulated UDP processing unit 105, the transmitting and receiving unit 106, the storing unit 107, and a STUN client 1208.

The second embodiment is different from the first embodiment in that the STUN client 1208 is added, and also in terms of the functions of the IKE processing unit 1201 and the UDP processing unit 1203. Other configurations and functions are the same as the ones shown in FIG. 3, which is the block diagram of the communication device 100 according to the first embodiment. Thus, the same elements will be referred to by using the same reference characters, and the explanation thereof will be omitted.

Like the IKE processing unit 101 according to the first embodiment, the IKE processing unit 1201 processes an IKE message, which is a message transmitted to and received from the server 1240 according to an IKE protocol. According to the second embodiment, the IKE processing unit 1201 is different from the IKE processing unit 101 according to the first embodiment in that it does not perform a processing on the IKE message that is extended so as to contain a NAT translated source port number, because the IKE message is not extended, and the processing is performed according to the standard IKE protocol.

Like the UDP processing unit 103 according to the first embodiment, the UDP processing unit 1203 processes a UDP datagram that is transmitted to and received from the server 1240 according to a UDP.

Also, in addition to the functions of the UDP processing unit 103 according to the first embodiment, the UDP processing unit 1203 appends a UDP header to a Binding Request that is a STUN message passed from the STUN client 1208 and passes the Binding Request with the UDP header to the transmitting and receiving unit 106.

The Binding Request is a message that is transmitted when a query is made to the STUN server 1250 about the address information of a source.

Further, the UDP processing unit 1203 is different from the UDP processing unit 103 according to the first embodiment in that, when a UDP payload does not contain an ESP header and if the source device is the server 1240, the UDP processing unit 1203 passes the UDP payload to the IKE processing unit 1201, whereas if the source device is the STUN server 1250, the UDP processing unit 1203 passes the UDP payload to the STUN client 1208.

The STUN client 1208 generates a Binding Request that is a STUN message and passes the generated Binding Request to the UDP processing unit 1203, and also obtains, from a Binding Response that is a STUN message passed from the UDP processing unit 1203, a source port number obtained after a NAT translation is performed on the Binding Request and then storing the obtained source port number into the storing unit 107.

The Binding Response is a message that contains the address information returned by the STUN server 1250 in response to the received Binding Request.

Figure 14:
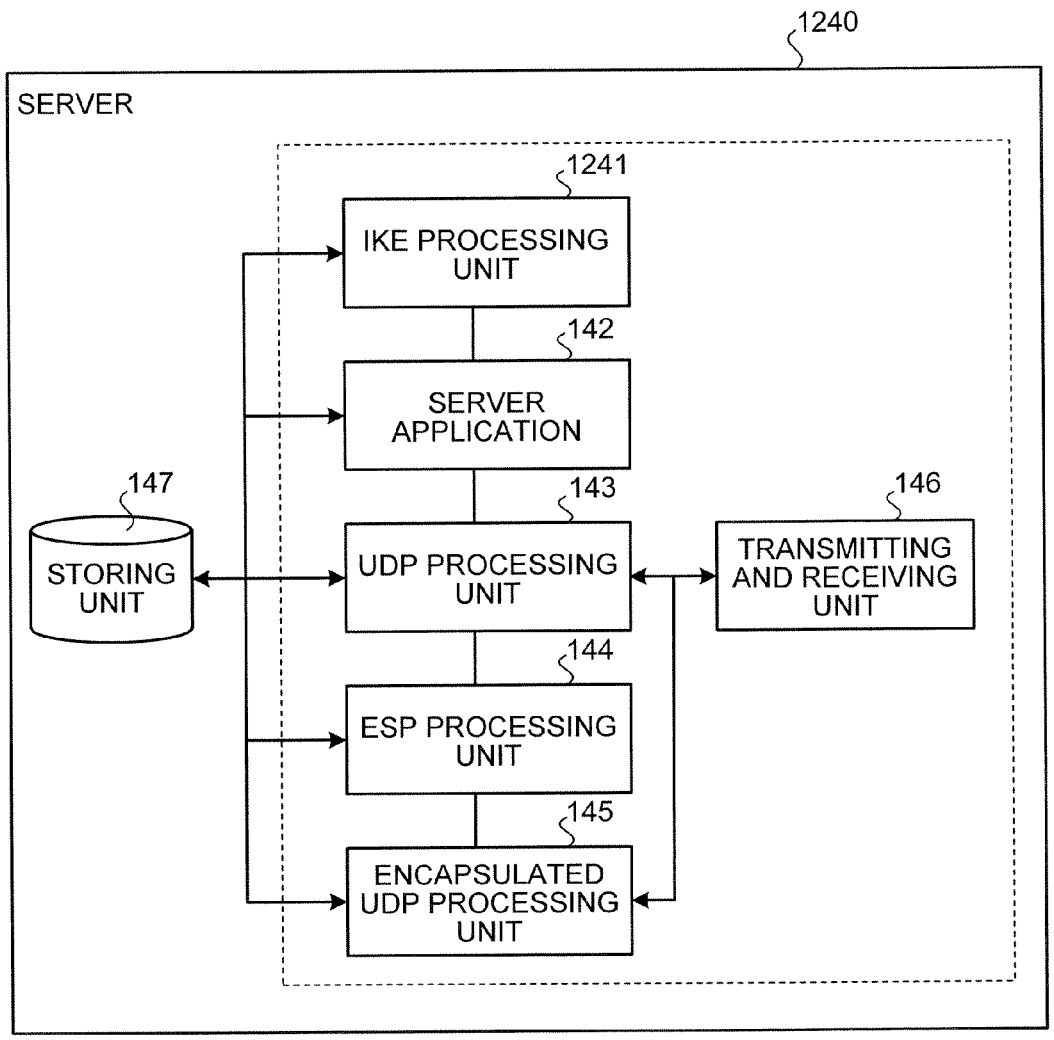
FIG. 14 is a block diagram of a server according to the second embodiment.

As shown in FIG. 14, the server 1240 includes an IKE processing unit 1241, the server application 142, the UDP processing unit 143, the ESP processing unit 144, the encapsulated UDP processing unit 145, the transmitting and receiving unit 146, and the storing unit 147.

The second embodiment is different from the first embodiment in terms of the functions of the IKE processing unit 1241. Other configurations and functions are the same as the ones shown in FIG. 4, which is the block diagram of the communication device 100 according to the first embodiment. Thus, the same elements will be referred to by using the same reference characters, and the explanation thereof will be omitted.

Like the IKE processing unit 141 according to the first embodiment, the IKE processing unit 1241 processes an IKE message, which is a message transmitted to and received from the communication device 1200 according to an IKE protocol. According to the second embodiment, however, the IKE processing unit 1241 is different from the IKE processing unit 141 according to the first embodiment in that it does not have the function of generating and transmitting an extended IKE message.

Figure 15:
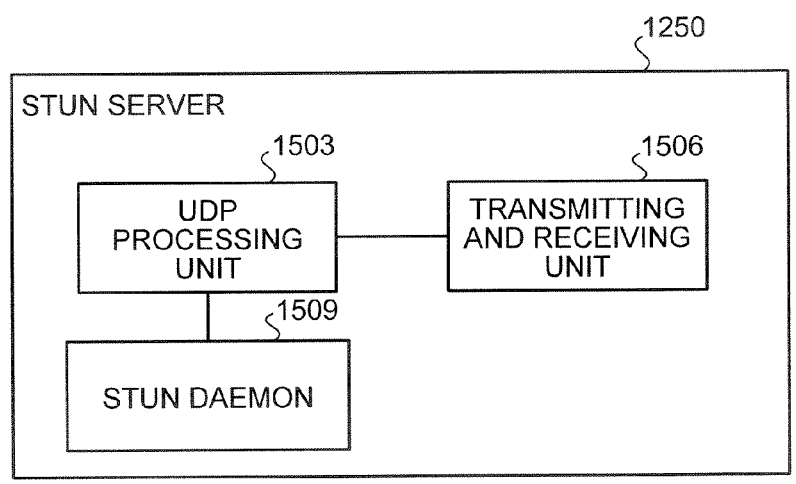
FIG. 15 is a block diagram of a STUN server according to the second embodiment.

As shown in FIG. 15, the STUN server 1250 includes a UDP processing unit 1503, a transmitting and receiving unit 1506, and a STUN daemon 1509.

It is sufficient if the STUN server 1250 operates according to a STUN protocol. Thus, the STUN server 1250 does not need to have any extra function. The STUN server 1250 waits to receive a STUN message at the UDP port numbers pt1 and pt2.

The UDP processing unit 1503 processes a UDP datagram that is transmitted to and received from the communication device 1200 according to a UDP. More specifically, the UDP processing unit 1503 appends a UDP header to a Binding Response passed from the STUN daemon 1509 and passes the Binding Response with the UDP header to the transmitting and receiving unit 1506, and also deletes a UDP header from a Binding Request passed from the transmitting and receiving unit 1506 and passes the Binding Request after the deletion to the STUN daemon 1509.

The STUN daemon 1509 generates a Binding Response in response to the Binding Request passed from the UDP processing unit 1503 and passes the generated Binding Response to the UDP processing unit 1503.

The transmitting and receiving unit 1506 appends an IP header to the Binding Response passed from the UDP processing unit 1503 and transmits the Binding Response with the IP header to the communication device 1200. Also, the transmitting and receiving unit 1506 deletes the IP header from a Binding Request received from the communication device 1200 and passes the Binding Request after the deletion to the UDP processing unit 1503.

Figure 16:
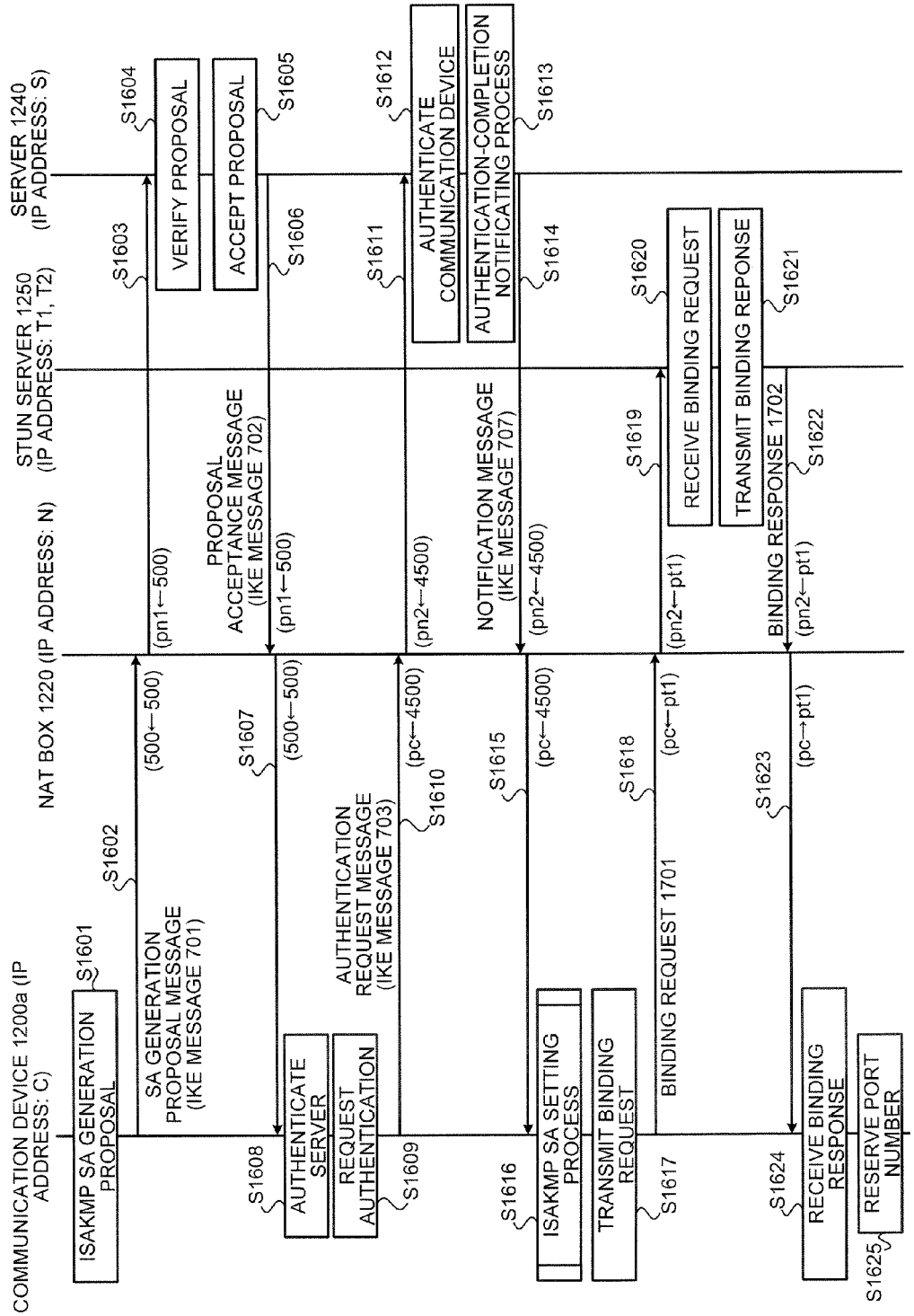
FIG. 16 is a sequence chart of an overall procedure in a communication processing according to the second embodiment.

Next, the communication processing performed between the communication device 1200, the server 1240, and the STUN server 1250 according to the second embodiment that are configured as described above will be explained based on FIG. 16.

The ISAKMP SA generation proposal processing, the server authentication processing, and the communication device authentication processing at step S1601 through step S1612 are the same as the processing performed by the communication device 100 according to the first embodiment at step S501 through step S512. Thus, the explanation thereof will be omitted.

After the authentication processing of the communication device 1200 is performed, the server 1240 performs an authentication-completion notification processing to notify that the authentication has been completed (step S1613). More specifically, the processing as described below is performed at step S1613.

First, the IKE processing unit 1241 generates an IKE message 707 and passes the generated IKE message 707 to the UDP processing unit 143. The UDP processing unit 143 appends a UDP header in which the source port number is 4500 and the destination port number is pn2 to the IKE message 707 and passes the IKE message 707 with the UDP header to the transmitting and receiving unit 146. The transmitting and receiving unit 146 appends an IP header in which the source IP address is S and the destination IP address is N to the IKE message 707.

As shown in FIG. 7, the IKE message 707 contains only an ISAKMP header (HDR). As observed here, the second embodiment is different from the first embodiment in that the message contains no NAT-OPi payload that is extended so that the source port number can be written therein.

As a result of the authentication completion notification processing, the IKE message 707 is transmitted to the NAT Box 1220 via the Internet 130 (step S1614).

Next, the NAT Box 1220 receives the IKE message 707, performs a NAT translation on the IKE message 707, and forwards the NAT translated IKE message to the communication device 1200 (step S1615). As a result, the destination IP address in the IKE message 707 has been translated into C, and also the destination port number has been translated into PC.

Subsequently, the communication device 1200 performs an ISAKMP SA setting processing (step S1616). The details of the ISAKMP SA setting processing will be described later.

Next, the communication device 1200 performs a Binding Request transmission processing to query to the STUN server 1250 about address information (step S1617). More specifically, the processing as described below is performed at step S1617.

First, the STUN client 1208, that has been requested by the client application 102 that the port number should be detected, generates a Binding Request and passes the generated Binding Request to the UDP processing unit 1203. The UDP processing unit 1203 appends a UDP header in which the source port number is PC and the destination port number is pt1 to the Binding Request and passes the Binding Request with the UDP header to the transmitting and receiving unit 106. The transmitting and receiving unit 106 appends an IP header in which the source IP address is C and the destination IP address is T1 to the Binding Request.

Figure 17:
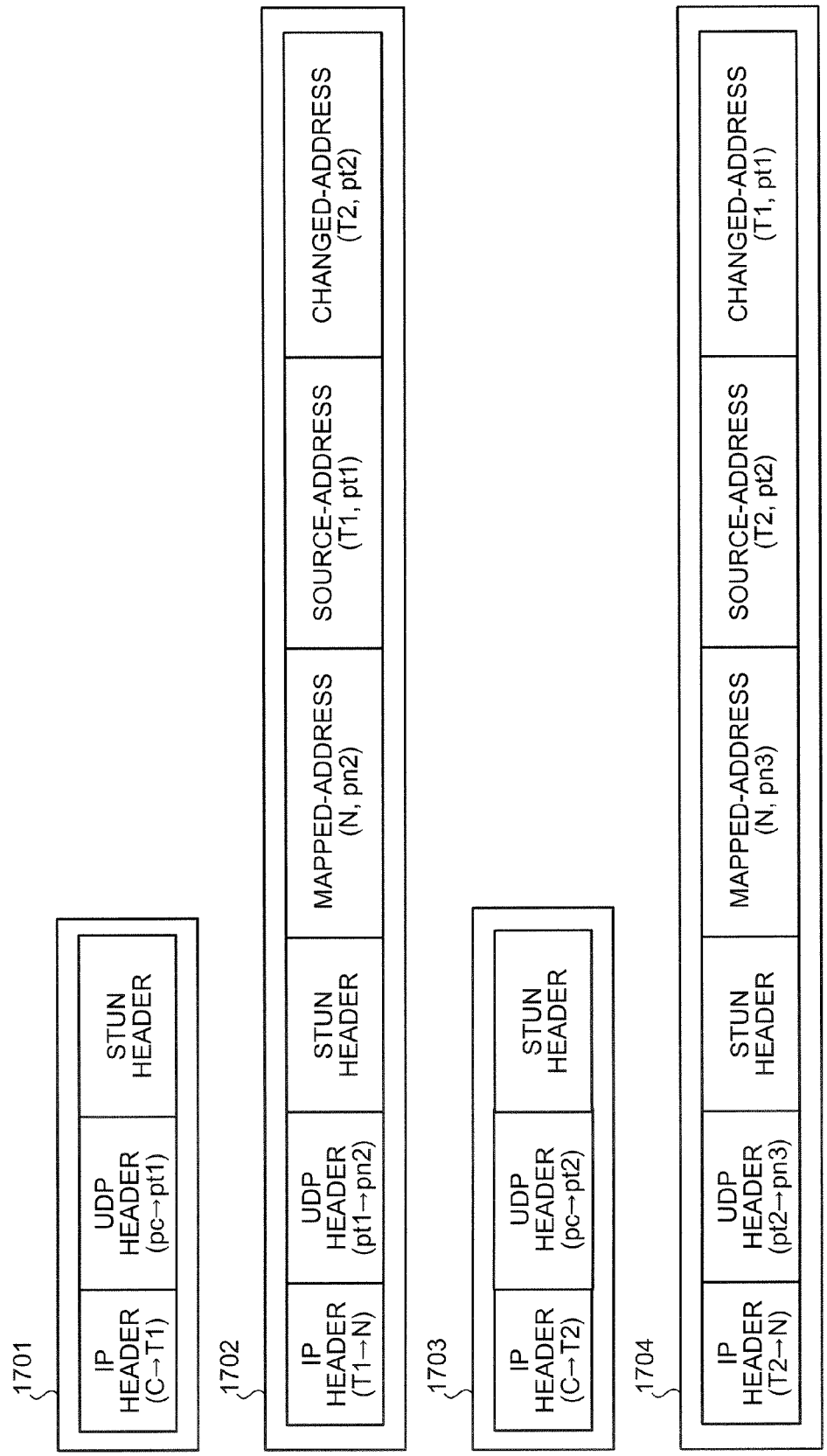
FIG. 17 is a drawing for explaining an example of a format of a STUN message transmitted and received according to the second embodiment.

A Binding Request 1701 is configured so as to be in a format that is compliant with the STUN protocol. As shown in FIG. 17, the Binding Request 1701 contains a STUN header.

The Binding Request 1701 to which the IP header has been appended at step S1617 is transmitted to the NAT Box 1220 by the transmitting and receiving unit 106 (step S1618).

Next, the NAT Box 1220 receives the Binding Request 1701, performs a NAT translation on the Binding Request 1701, and forwards the NAT translated Binding Request to the Internet 130 (step S1619).

The source IP address and the source port number in the Binding Request 1701 are the same as those in the IKE message 707 that has already been transmitted. Thus, when the NAT Box 1220 is a Cone NAT, the source IP address in the Binding Request 1701 is translated into N, and also the source port number is translated into pn2.

Next, the STUN server 1250 performs a Binding Request reception processing (step S1620). More specifically, the processing as described below is performed at step S1620.

First, the transmitting and receiving unit 1506 receives the Binding Request 1701 and passes a UDP datagram, which is obtained by deleting the IP header from the Binding Request 1701, to the UDP processing unit 1503. The UDP processing unit 1503 passes the UDP payload, which is obtained by deleting the UDP header from the passed UDP datagram, to the STUN daemon 1509.

Next, the STUN sever 1250 performs a Binding Response transmission processing (step S1621). More specifically, the processing as described below is performed at step S1621.

First, the STUN daemon 1509 generates a Binding Response 1702 in which the source UDP port number pn2 in the Binding Request 1701 is written, and passes the generated Binding Response 1702 to the UDP processing unit 1503. The UDP processing unit 1503 appends a UDP header in which the source port number is pt1 and the destination port number is pn2 to the Binding Response 1702 and passes the Binding Response 1702 with the UDP header to the transmitting and receiving unit 1506. The transmitting and receiving unit 1506 appends an IP header in which the source IP address is T1 and the destination IP address is N to the Binding Response 1702.

As shown in FIG. 17, the Binding Response 1702 includes a STUN header, a MAPPED-ADDRESS attribute, a SOURCE-ADDRESS attribute, and a CHANGED-ADDRESS attribute. The source port number pn2 of the Binding Request 1701 is included in the MAPPED-ADDRESS attribute.

The Binding Response 1702 to which the IP header has been appended at step S1621 is transmitted to the NAT Box 1220 by the transmitting and receiving unit 1506 (step S1622).

Next, the NAT Box 1220 receives the Binding Response 1702, performs a NAT translation on the Binding Response 1702, and forwards the NAT translated Binding Response to the communication device 1200 (step S1623). As a result, the destination IP address in the Binding Response 1702 has been translated into C, and also the destination port number has been translated into pc.

Subsequently, the communication device 1200 performs a Binding Response reception processing (step S1624). More specifically, the processing as described below is performed at step S1624.

First, the transmitting and receiving unit 106 receives the Binding Response 1702 and passes a UDP datagram, which is obtained by deleting the IP header from the Binding Response 1702, to the UDP processing unit 1203. The UDP processing unit 1203 deletes the UDP header from the passed UDP datagram so as to obtain a UDP payload. Because the UDP payload does not contain an ESP header, and also because the source is the STUN server 1250, the UDP processing unit 1203 passes the UDP payload to the STUN client 1208. The STUN client 1208 stores, into the storing unit 107, the source port number pn2 that is written in the MAPPED-ADDRESS attribute within the passed Binding Response 1702 and notifies the client application 102 that the source port number pn2 has been obtained.

The port number reservation processing at step S1625 is the same as the processing performed by the communication device 100 at step S517 according to the first embodiment. Thus, the explanation thereof will be omitted.

Also, the IPSec SA generation proposal processing, the IPSec SA generation proposal verification processing, the parameter notification processing, the IPSec SA setting processing, the ESP packet generation processing, and the ESP packet reception processing that are performed thereafter are the same as the processing performed at step S518 through step S529 that are shown in FIG. 6 according to the first embodiment. Thus, the explanation thereof will be omitted.

As described above, the second embodiment is different from the first embodiment in that the NAT translated source port number is obtained from the Binding Response 1702 returned from the STUN server 1250 that provides the address information (step S1620 and step S1624) according to the second embodiment, whereas the NAT translated source port number is obtained from the IKE message transmitted by the server 140 (step S513 and step S516) according to the first embodiment.

Figure 18:
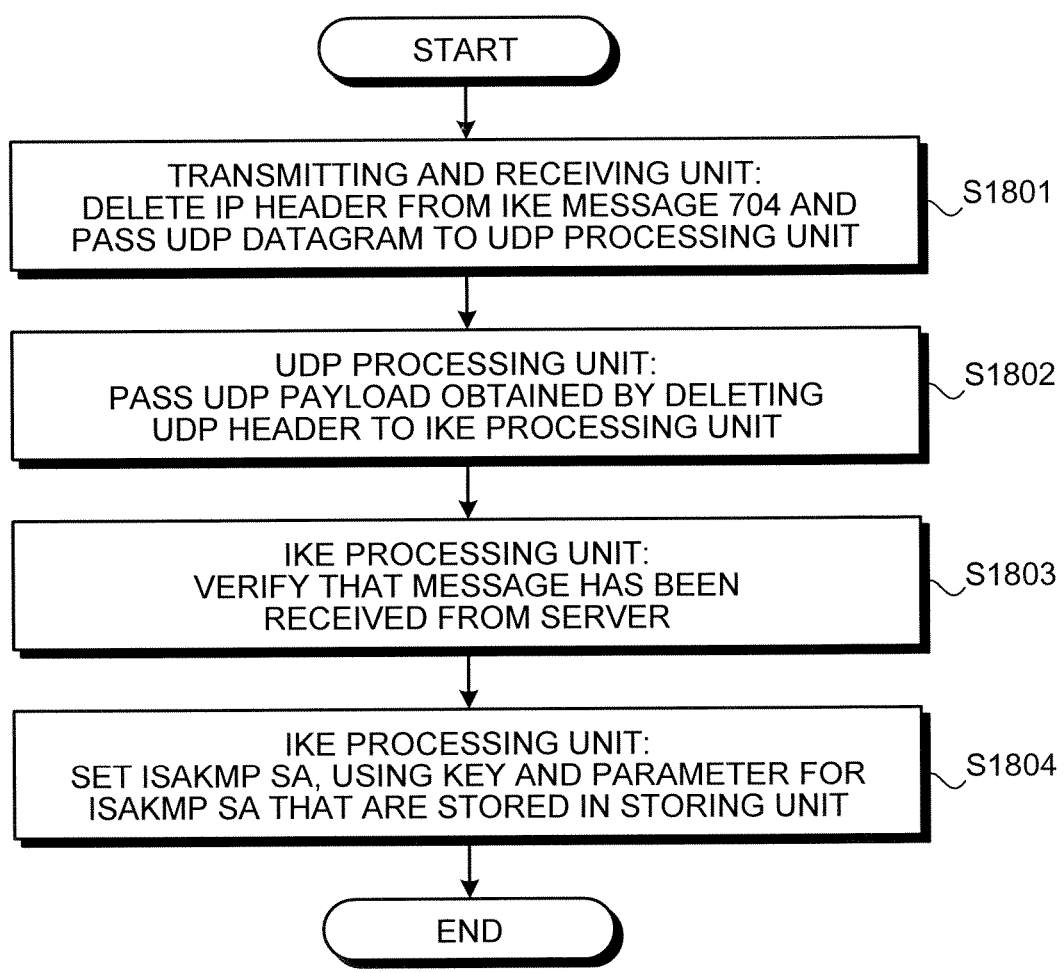
FIG. 18 is a flowchart of an overall procedure in an ISAKMP SA setting processing according to the second embodiment.

Next, the details of the ISAKMP SA setting processing performed at step S1616 will be described based on FIG. 18.

First, the transmitting and receiving unit 106 in the communication device 1200 receives the IKE message 704 and passes a UDP datagram, which is obtained by deleting the IP header from the IKE message 704, to the UDP processing unit 1203 (step S1801).

Next, the UDP processing unit 1203 deletes the UDP header from the passed UDP datagram and passes a UDP payload to the IKE processing unit 1201 (step S1802). The reason is because the UDP payload does not contain an ESP header, and also the source is the server 1240.

Subsequently, the IKE processing unit 1201 verifies that the message has been received from the server 1240, using the SIGNATURE payload or the like (step S1803).

Next, the IKE processing unit 1201 reads the parameter that is required in the generation of the ISAKMP SA and has been stored in the storing unit 107 at step S1608, sets an ISAKMP SA with the read parameter, and notifies the client application 102 that the setting of the ISAKMP SA has been completed (step S1804).

As described above, the ISAKMP SA setting processing according to the second embodiment is different from the one according to the first embodiment in that the processing of storing the source port number (pn2) obtained from the extended IKE message 704 into the storing unit 107 is not performed.

Figure 19:
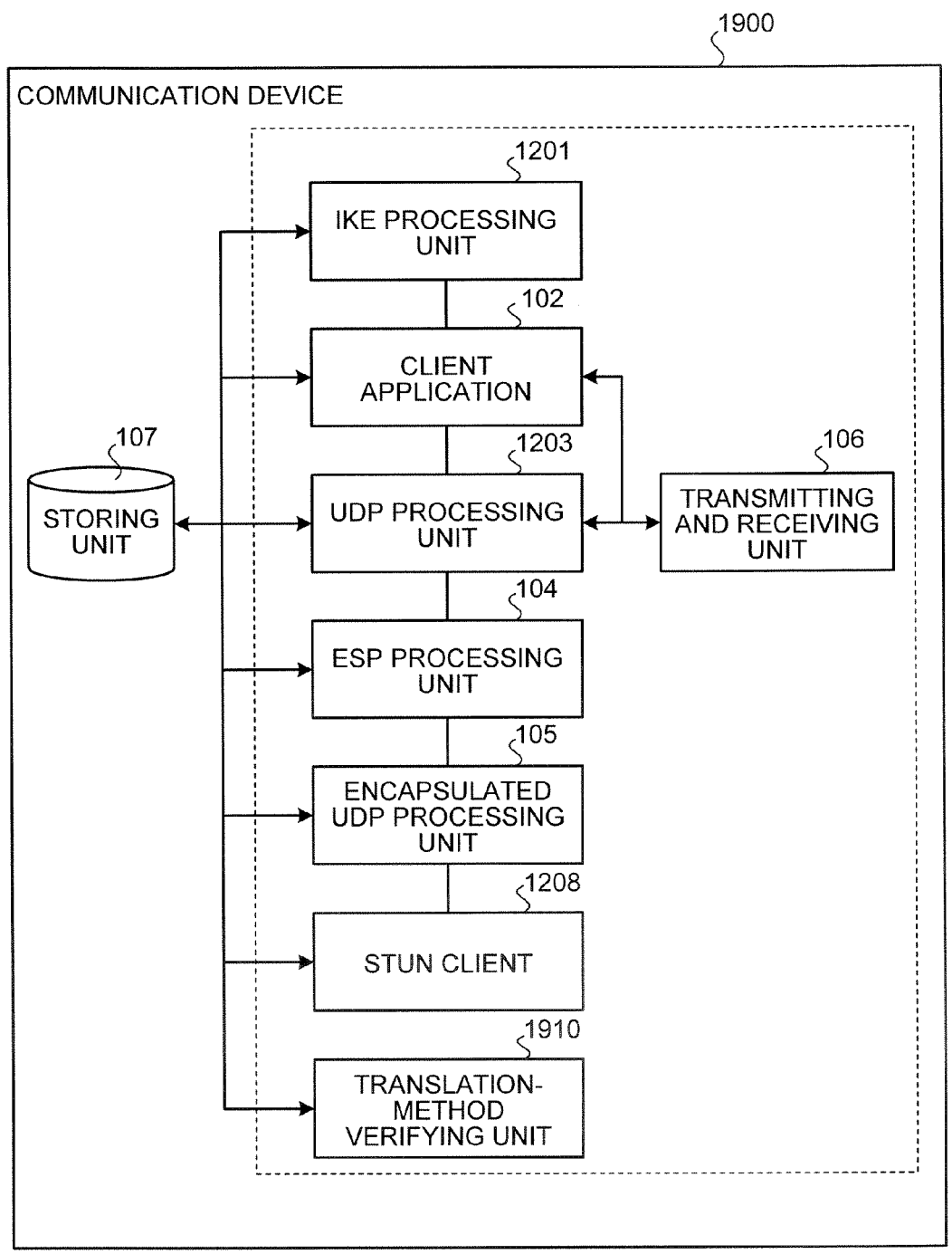
FIG. 19 is a block diagram of another communication device according to the second embodiment.

Another arrangement is acceptable in which a processing of checking to see whether the NAT Box 1220 is a Cone NAT is performed, immediately after the processing at step S1624 is performed. As shown in FIG. 19, a communication device 1900 includes a translation method verifying unit 1910 that checks the NAT translation method used by the NAT Box 1220. The NAT translation method checking processing is performed as below.

First, the STUN client 1208 transmits a Binding Request 1703, as shown in FIG. 17, in which either the destination IP address has been changed to T2 or the destination port number has been changed to pt2, to the STUN server 1250.

Next, the transmitting and receiving unit 106 receives a Binding Response 1704 that is returned by the STUN server 1250 in response to the Binding Request 1703.

Subsequently, the translation method verifying unit 1910 checks to see whether the port number pn3 written in the MAPPED-ADDRESS attribute within the Binding Response 1704 is equal to pn2. If pn3 is equal to pn2, the translation method verifying unit 1910 judges that the NAT Box 1220 is a Cone NAT.

If the NAT Box 1220 is a Cone NAT, because it is possible to properly transmit and receive packets to and from the server 1240, the processing is continued. If the NAT Box 1220 is not a Cone NAT, there is a possibility that it may not be possible to properly transmit and receive packets to and from the server 1240, the translation-method verifying unit 1910 terminates the processing.

Another arrangement is acceptable in which the server 1240 has the functions of the STUN server 1250 so that the server 1240 performs the address information providing processing, in place of the STUN server 1250. In such a situation, the NAT Box 1220 does not have to a Cone NAT because there is no possibility that the source port number changes dependent on the device which communication device 1900 communicate with.

As described above, when the communication device according to the second embodiment is used, the NAT translated source port number is received from the STUN server that provides the information related to the address including the source port number, and the received source port number is specified as the source port number according to the protocol being encapsulated with the encryption protocol, so that it is possible to communicate with the server. Thus, the application within the server is able to communicate with multiple devices under the network forwarding device, without occurrence of miscommunication caused by the encapsulation. In addition, because it is not necessary for the server to perform the processing of replacing the source port number or the like, it is possible to perform the communication while miscommunication is avoided, without increasing the processing load of the server.

It is possible to further apply the contents of the present invention to the case where, in the first embodiment or the second embodiment, the server has a function of checking to see whether miscommunication may occur, as disclosed in Document 1. In other words, according to the technique of the present invention, the communication device is able to perform the processing of avoiding miscommunication; however, another arrangement is acceptable in which the server further checks for miscommunication, to improve reliability of the communication.

The communication device according to the first embodiment or the second embodiment includes a controlling device such as a Central Processing Unit (CPU), a storage device such as a Read Only Memory (ROM) or a Random Access Memory (RAM), an external storage device such as a Hard Disk Drive (HDD) or a Compact Disc (CD) drive device, a display device such as a display monitor, and an input device such as a keyboard or a mouse. The communication device has a hardware configuration in which a common computer is used.

The communication program executed by the communication device according to the first embodiment or the second embodiment is provided as being recorded on a computer-readable recording medium such as a Compact Disk Read Only Memory (CD-ROM), a Flexible Disk (FD), a Compact Disk Recordable (CD-R), or a Digital Versatile Disk (DVD), in a file that is in an installable format or in an executable format.

It is acceptable to provide the communication program executed by the communication device according to the first embodiment or the second embodiment by storing the communication program into a computer connected to a network such as the Internet and allowing the communication program to be downloaded via the network. Alternatively, it is acceptable to provide or distribute the communication program executed by the communication device according to the first embodiment or the second embodiment via a network such as the Internet.

Further alternatively, it is acceptable to provide the communication program according to the first embodiment or the second embodiment by incorporating the communication program into a ROM or the like in advance.

The communication program executed by the communication device according to the first embodiment or the second embodiment has a module structure that includes the constituent elements described above (e.g. the IKE processing unit, the client application, the UDP processing unit, the ESP processing unit, the encapsulated UDP processing unit, the transmitting and receiving unit, the STUN client, and the translation method verifying unit). In the actual hardware, the constituent elements are loaded onto a main storage device, and the constituent elements are generated in the main storage device, when the CPU (i.e. the processor) reads the communication program from the storage medium described above and executes the communication program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device, comprising:
   a first transmitting unit that transmits to a server a first message created according to a first protocol, the first protocol being a protocol in which a network forwarding device translates a source port number, the network forwarding device translating each source port number contained in a protocol header of transmitted messages into a source port number for communicating with an external network;
   a receiving unit that receives a port number message including a translated port number from the server via the network forwarding device, the translated port number being a source port number obtained after the network forwarding device performs an address translation when the first message is transmitted to the server;
   a storing unit that stores the translated port number;
   a first protocol processing unit that generates a second message that is to be transmitted according to the first protocol and in which a source port number contained in a protocol header according to the first protocol is specified as a same value as the stored translated port number, which differs for each source, the second message being transmitted to the server by an application that communicates with the server using the translated port number;
   a second protocol processing unit that generates a third message, in which the first protocol is concealed, by appending, to the generated second message, a header encrypted according to a second protocol which is not decrypted by the server;
   a third protocol processing unit that generates a fourth message, in which the first protocol is concealed, by appending a header according to a third protocol to the generated third message, the third protocol being a protocol in which the network forwarding device translates a source port number contained in the header according to the third protocol, and the source port number contained in the header according to the third protocol being a value to be translated to the translated port number; and
   a second transmitting unit that transmits the generated fourth message to the server via the network forwarding device.

2. The communication device according to claim 1, wherein
   the first transmitting unit further transmits to the server a communication establishment message that is transmitted according to the first protocol and includes information used when a communication according to an encryption protocol is to be established, and
   the receiving unit receives the port number message via the network forwarding device, the port number message having been transmitted by the server and having been arranged so that a source port number contained in a protocol header of the communication establishment message is specified as the translated port number.

3. The communication device according to claim 2, wherein the first transmitting unit further transmits to the server the communication establishment message that is transmitted according to the first protocol and includes information used when a communication according to an Internet Key Exchange (IKE) protocol is to be established.

4. The communication device according to claim 3, wherein the receiving unit receives, via the network forwarding device, the port number message that has been arranged and transmitted by the server so that an area into which the translated port number is stored is added to an IKE message transmitted according to the IKE protocol and the source port number contained in the protocol header of the communication establishment message is specified as the translated port number in the added area.

5. The communication device according to claim 3, wherein the receiving unit receives, via the network forwarding device, the port number message that has been arranged and transmitted by the server so that the source port number contained in the protocol header of the communication establishment message is specified as the translated port number in an unused area included in an IKE message transmitted according to the IKE protocol.

6. A communication device, comprising:
   a first transmitting unit that transmits a first message to an address information providing device that provides information related to an address including a source port number, via a network forwarding device, the first message being transmitted according to a first protocol, the first protocol being a protocol in which the network forwarding device translates a source port number, and the network forwarding device translating a source Internet Protocol (IP) address and the source port number into values to make it possible to communicate with an external network, for each of a plurality of corresponding tuples, source IP address, and source port number contained in a protocol header of a transmitted message;

a receiving unit that receives an address information message from the address information providing device via the network forwarding device, the address information message including a translated port number that is a source port number obtained after the network forwarding device performs an address translation when the first message is transmitted to the address information providing device;

a storing unit that stores the translated port number;

a first protocol processing unit that generates a second message to be transmitted according to the first protocol and in which a source port number contained in a protocol header according to the first protocol is specified as a same value as the stored translated port number, which differs for each source, the second message being transmitted to the server by an application that communicates with the server using the translated port number;

a second protocol processing unit that generates a third message, in which the first protocol is concealed, by appending, to the generated second message, a header encrypted according to a second protocol which is not decrypted by the server;

a third protocol processing unit that generates a fourth message, in which the first protocol is concealed, by appending a header according to a third protocol to the generated third message, the third protocol being a protocol in which the network forwarding device translates a source port number contained in the header according to the third protocol, and the source port number contained in the header according to the third protocol being a value to be translated to the translated port number; and a second transmitting unit that transmits the generated fourth message to a server via the network forwarding device.

7. The communication device according to claim 6, wherein the first transmitting unit further transmits a modified first message to the address information providing device via the network forwarding device, the modified first message being obtained by changing one of a destination IP address and a destination port number that are contained in a protocol header of the first message, and the communication device further comprising:

a translation method verifying unit that judges whether a first translated port number is same as a second translated port number and terminates a communication when having judged that the first translated port number is not the same as the second translated port number, the first translated port number being the translated port number contained in the address information message transmitted by the address information providing device in response to the first message before the one of the destination IP address and the destination port number is changed, and the second translated port number being the translated port number contained in the address information message transmitted by the address information providing device in response to the modified first message obtained by changing the one of the destination IP address and the destination port number.

8. The communication device according to claim 1, wherein each of the first protocol and the third protocol is one of User Datagram Protocol (UDP) and Transmission Control Protocol (TCP).

9. The communication device according to claim 6, wherein each of the first protocol and the third protocol is one of User Datagram Protocol (UDP) and Transmission Control Protocol (TCP).

10. The communication device according to claim 1, wherein the second protocol is an Encapsulating Security Payload (ESP).

11. The communication device according to claim 6, wherein the second protocol is an Encapsulating Security Payload (ESP).

12. A communicating method, comprising:

transmitting to a server, using a first transmitting unit, a first message transmitted according to a first protocol, the first protocol being a protocol in which a network forwarding device translates a source port number, the network forwarding device translating each source port number contained in a protocol header of transmitted messages into a source port number for communicating with an external network;

receiving, using a receiving unit a port number message including a translated port number from the server via the network forwarding device, the translated port number being a source port number obtained after the network forwarding device performs an address translation when the first message is transmitted to the server;

storing the translated port number into a storing unit;

generating, using a first protocol processing unit, a second message to be transmitted according to the first protocol and in which a source port number contained in a protocol header according to the first protocol is specified as a same value as the stored translated port number, which differs for each source, the second message being transmitted to the server by an application that communicates with the server using the translated port number;

generating, using a second protocol processing unit, a third message, in which the first protocol is concealed, by appending, to the generated second message, a header encrypted according to a second protocol which is not decrypted by the server;

generating, using a third protocol processing unit, a fourth message, in which the first protocol is concealed, by appending a header according to a third protocol to the generated third message, the third protocol being a protocol in which the network forwarding device translates a source port number contained in the header according to the third protocol, and the source port number contained in the header according to the third protocol being a value to be translated to the translated port number; and transmitting, using a second transmitting unit, the generated fourth message to the server via the network forwarding device.

13. A communicating method, comprising:

transmitting, using a first transmitting unit, a first message to an address information providing device that provides information related to an address including a source port number, via a network forwarding device, the first message being transmitted according to a first protocol, the first protocol being a protocol in which the network forwarding device translates a source port number, and the network forwarding device translating a source Internet Protocol (IP) address and the source port number into values to make it possible to communicate with an external network, for each of a plurality of corresponding tuples, source IP address, and source port number contained in a protocol header of a transmitted message;

receiving, using a receiving unit, an address information message from the address information providing device via the network forwarding device, the address information message including a translated port number that is a source port number obtained after the network forwarding device performs an address translation when the first message is transmitted to the address information providing device;

storing the translated port number into a storing unit;

generating, using a first protocol processing unit, a second message to be transmitted according to the first protocol and in which a source port number contained in a protocol header according to the first protocol is specified as a same value as the stored translated port number, which differs for each source, the second message being transmitted to the server by an application that communicates with the server using the translated port number;

generating, using a second protocol processing unit, a third message, in which the first protocol is concealed, by appending, to the generated second message, a header encrypted according to a second protocol which is not decrypted by a server;

generating, using a third protocol processing unit, a fourth message, in which the first protocol is concealed, by appending a header according to a third protocol to the generated third message, the third protocol being a protocol in which the network forwarding device translates a source port number contained in the header according to the third protocol, and the source port number contained in the header according to the third protocol being a value to be translated to the translated port number; and transmitting, using a second transmitting device, the generated fourth message to the server via the network forwarding device.

* * * * *